United States Patent [19]

Knauth

[11] 4,270,694
[45] Jun. 2, 1981

[54] FLUID FLOW REGULATING SYSTEMS

[76] Inventor: Berthold A. Knauth, P.O. Box 2742, Daytona Beach, Fla. 32015

[21] Appl. No.: 7,562

[22] Filed: Jan. 29, 1979

Related U.S. Application Data

[60] Division of Ser. No. 853,470, Nov. 21, 1977, Pat. No. 4,174,065, which is a continuation-in-part of Ser. No. 838,676, Sep. 30, 1977, abandoned, which is a continuation of Ser. No. 692,845, Jun. 4, 1976, abandoned.

[51] Int. Cl.³ .................... F04B 49/00; F24F 11/04
[52] U.S. Cl. ................................. 236/49; 62/186; 174/15 R; 417/300
[58] Field of Search ............... 417/43, 423, 300, 20; 236/49; 62/186; 174/15 R

[56] References Cited

U.S. PATENT DOCUMENTS

| | | | |
|---|---|---|---|
| 1,419,316 | 6/1922 | Sherbondy | 417/43 |
| 3,653,590 | 4/1972 | Elsea | 236/49 |

Primary Examiner—William E. Wayner
Attorney, Agent, or Firm—Roger L. Martin

[57] ABSTRACT

Fluid flow regulating systems involving systems for controlling the motor speed of fluid pumping devices are disclosed. The speed control systems involve use of a velocity head force sensor that movably responds to the velocity head forces of an air stream delivered by the pumping device, and these movements in the positions assumed by the force sensor are detected and used to control the power delivered to the motor. Temperature change detectors are used in most embodiments to modify the force sensor movements so as to introduce temperature change factors as well as velocity head force change factors into the control of the power circuitry. Force sensor of the pivotal vane, bendable vane and airfoil types are shown, and temperature sensors of the bimetallic and expandable fluid types are also used. A biasing force resistive of the velocity head forces is imparted to the force sensor to establish desired speed levels of operation and bimetallic temperature sensors are used in some embodiments to provide not only the biasing force, but also a variance in the biasing force which is responsive to the changes in temperatures and thus, to introduce the temperature change factors into the force sensor movements.

13 Claims, 30 Drawing Figures

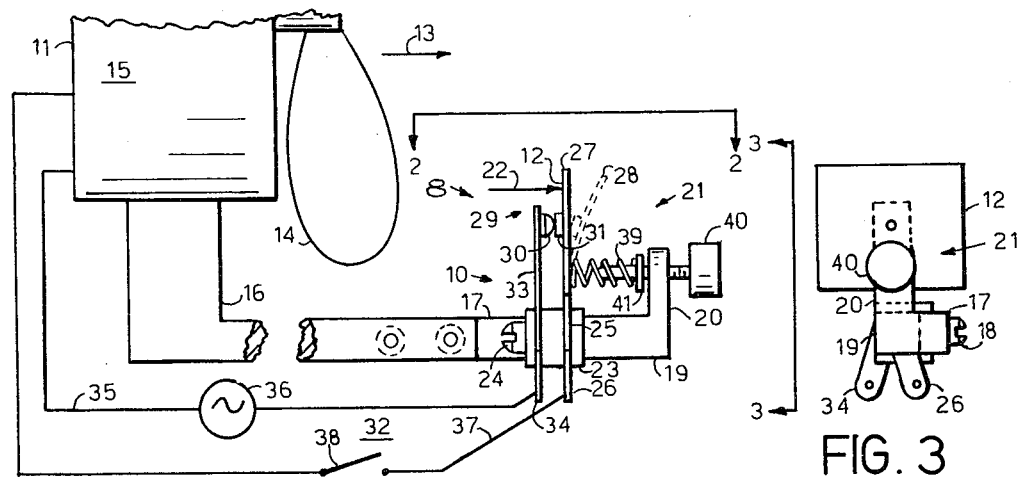
FIG. 1
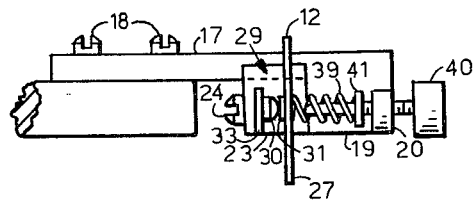
FIG. 3
FIG. 2
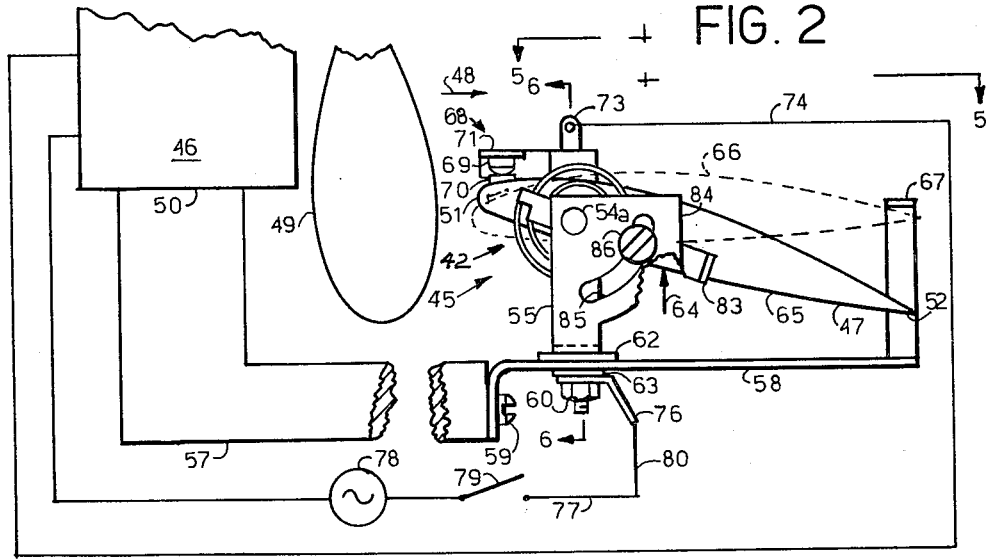
FIG. 4
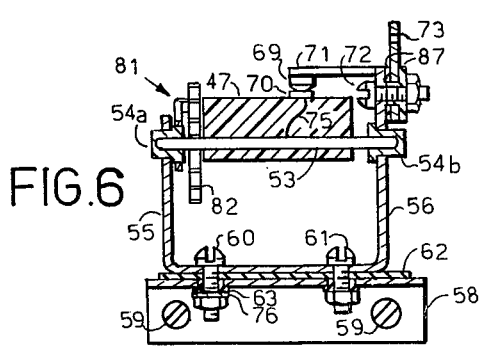
FIG. 6
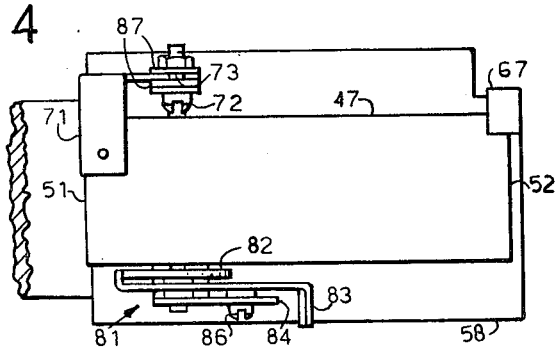
FIG. 5

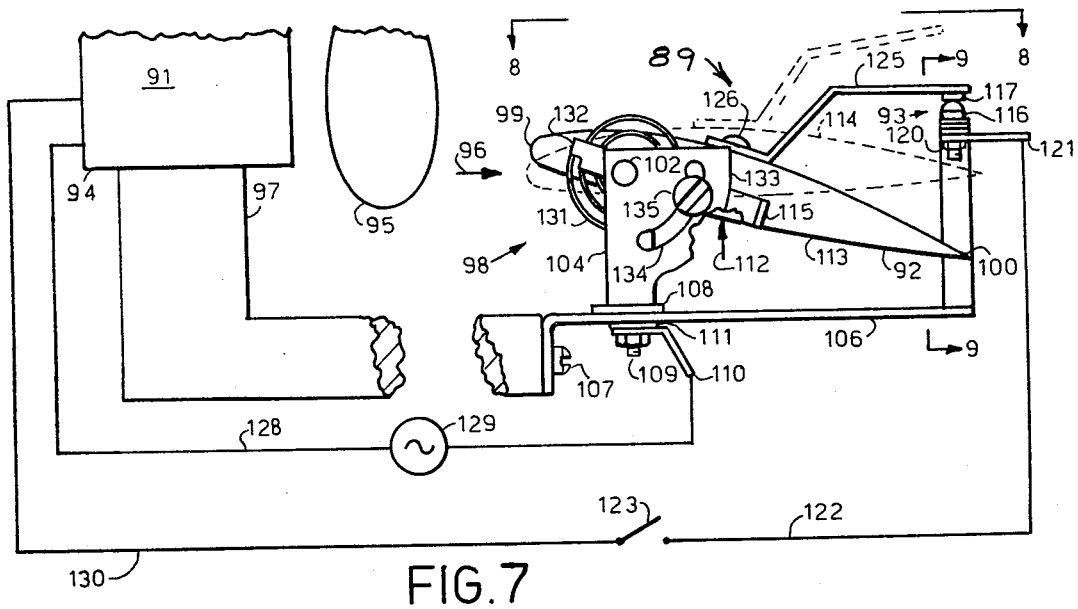
FIG.7
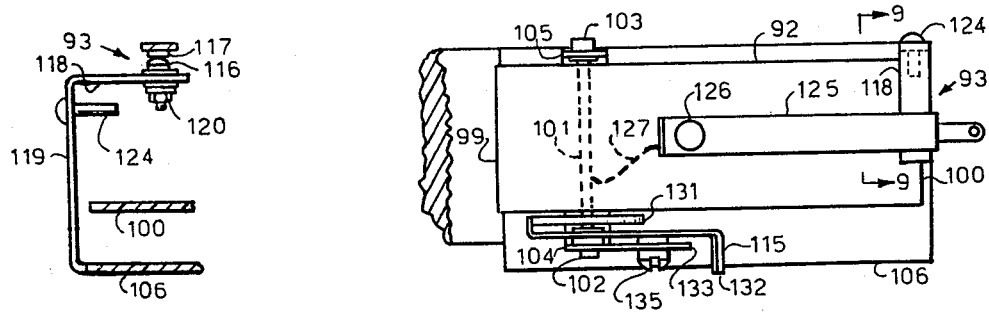
FIG.9  FIG.8
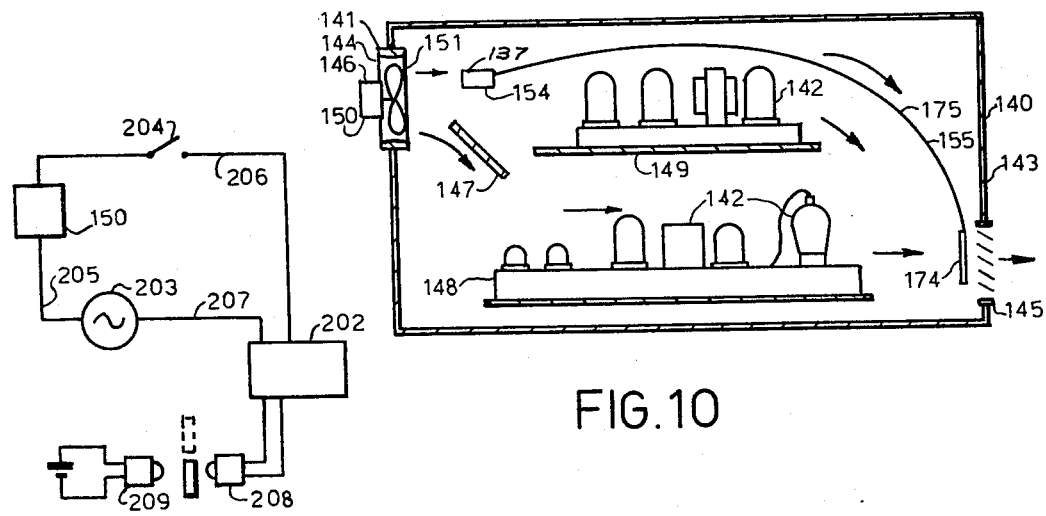
FIG.10
FIG.14

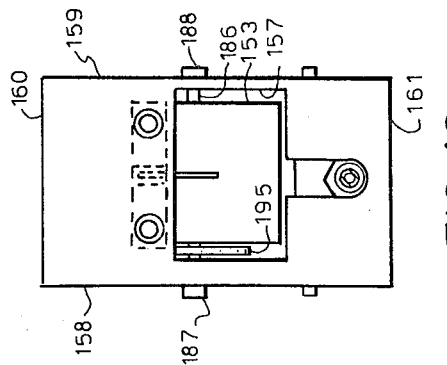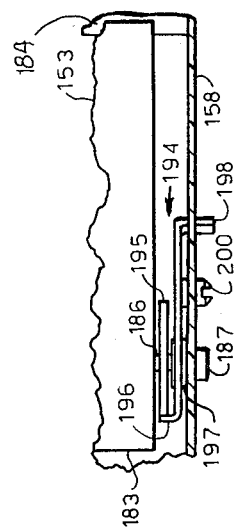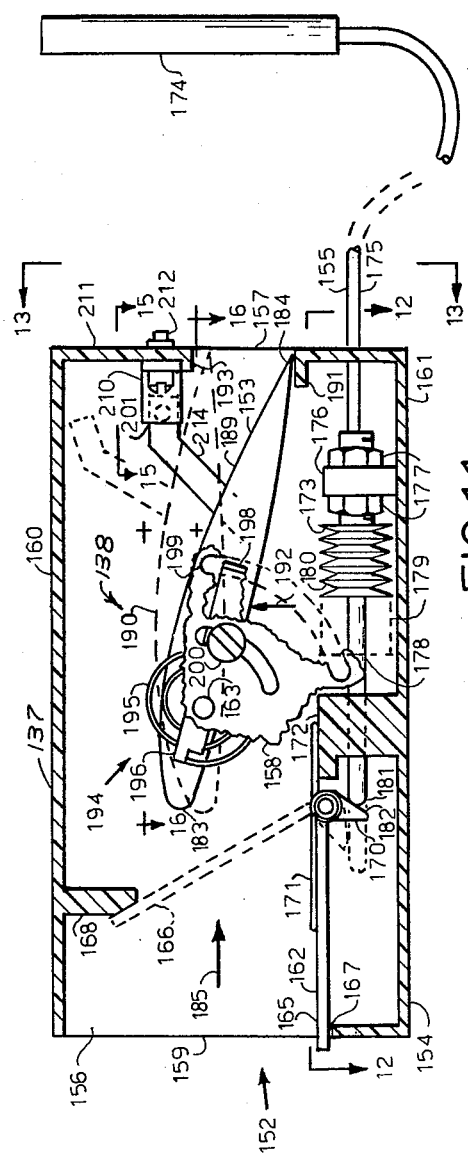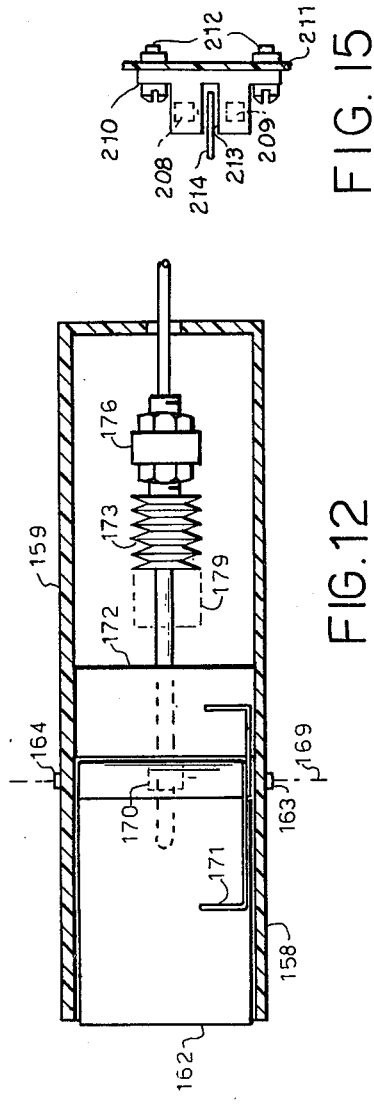

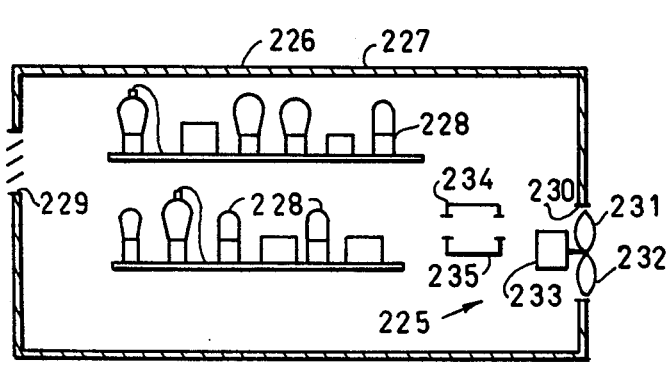
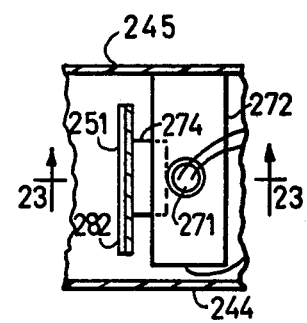
FIG. 17
FIG. 22
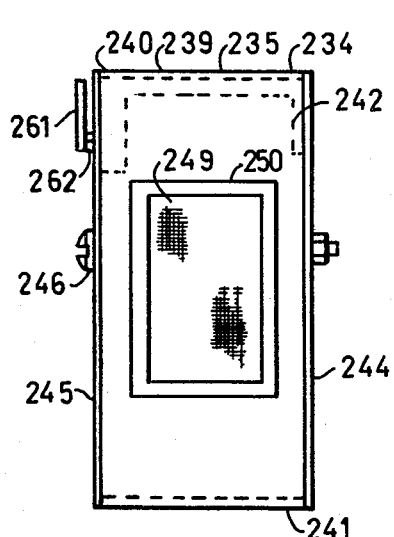
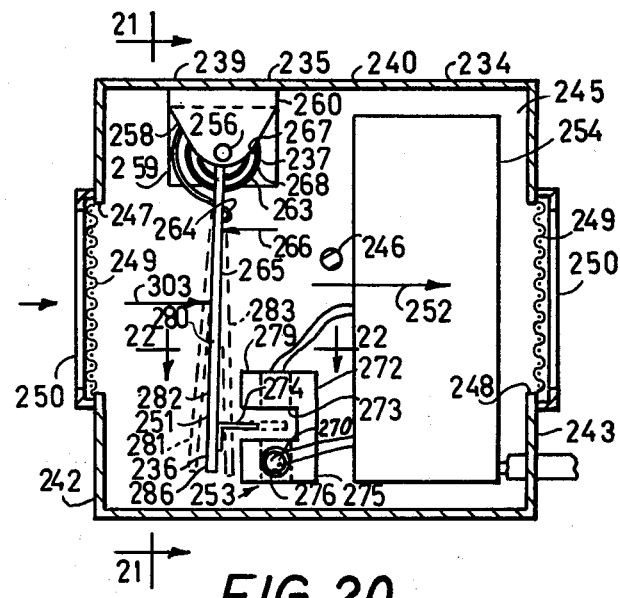
FIG. 19
FIG. 20
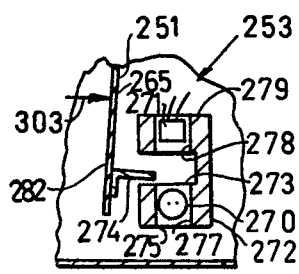
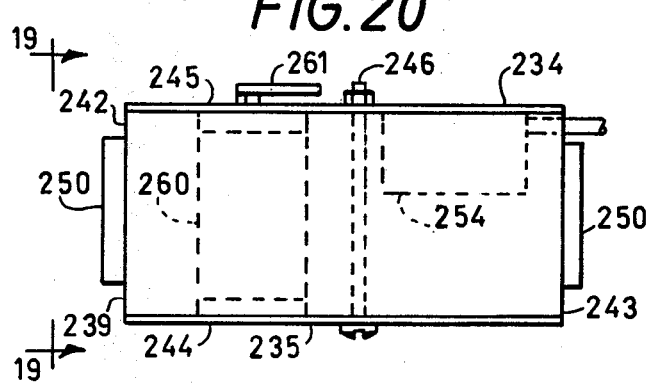
FIG. 23
FIG. 18

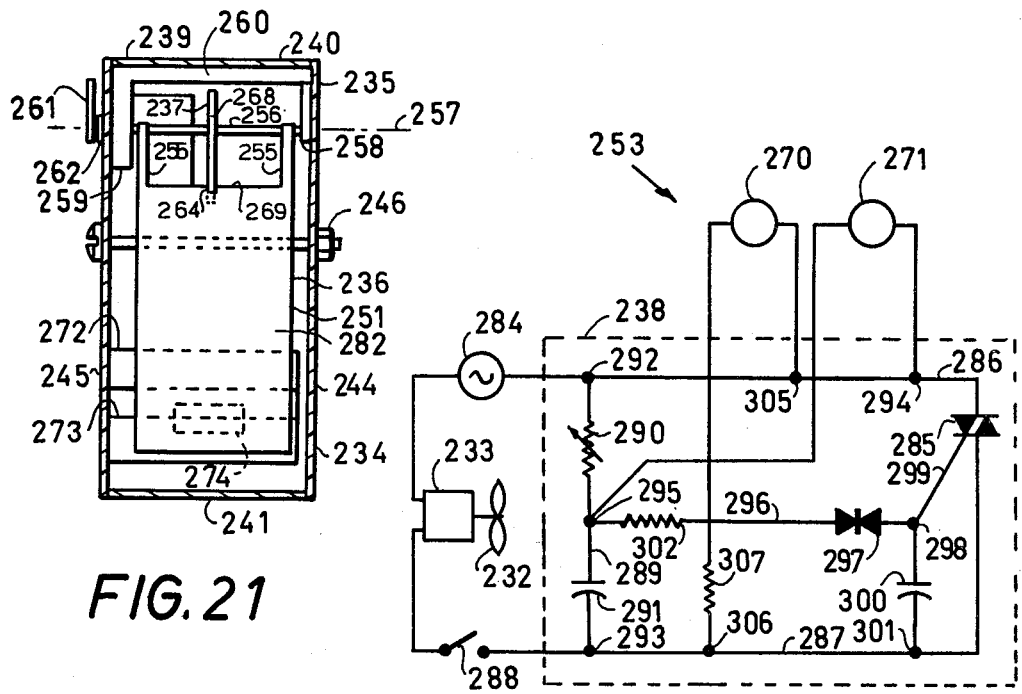
FIG. 21
FIG. 24
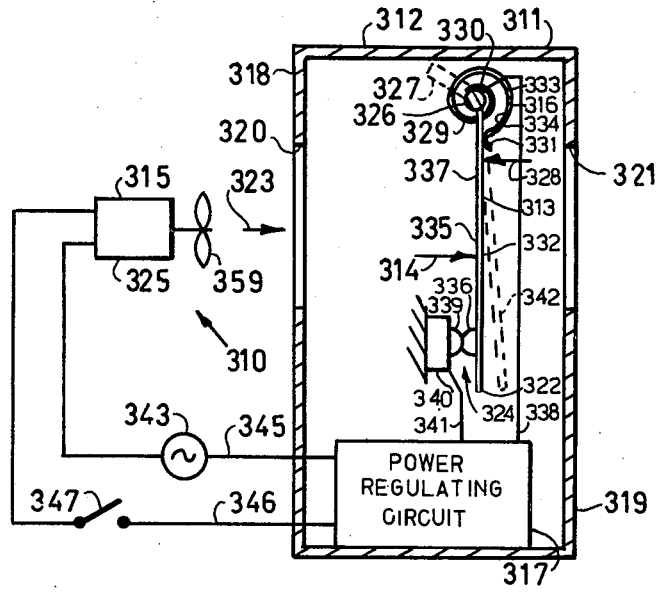
FIG. 25

FLUID FLOW REGULATING SYSTEMS

CROSS REFERENCES TO RELATED APPLICATIONS

This application is a division of the inventor's co-pending application entitled Fluid Flow Regulating Systems, Ser. No. 853,470, filed Nov. 21, 1977 now U.S. Pat. No. 4,174,065 as a continuation in part of the inventor's application, Ser. No. 838,676, filed: Sept. 30, 1977, now abandoned and entitled FLUID FLOW REGULATING SYSTEMS and which is a continuation of the inventor's application Ser. No. 692,845, now abandoned filed: June 4, 1976, and entitled: FLUID FLOW REGULATING SYSTEMS.

BACKGROUND OF THE INVENTION

This invention relates to fluid flow regulating systems and to motor speed control systems and devices for use with fluid pumping equipment such as forced air cooling fans and blowers.

Cooling fans are used for cooling work areas and electronic equipment housing areas to name but a few of such uses. In most industrial work area cooling applications, the fan speed is unregulated and the area temperatures accordingly fluctuate in dependency, among other things, upon the ambient air temperatures being delivered to the work area. At times, the airflow determined by the operating speed of the fan motor produces excessive cooling and uncomfortable conditions for the workers in the area. Apart from this, fans are a recognized source of noise pollution, and it is known that the noise level produced by a fan is roughly proportional to the fan speed. The unregulated flow of air in excess of the area demands is additionally wasteful of energy.

For electronic equipment cooling purposes, the general practice followed in selecting forced air fans for cooling the equipment has been one of selecting the fan which, at its continuously energized operating speed, will remove the greatest amount of heat that will be generated by the equipment during an operating cycle and under the highest ambient temperature and lowest pressure conditions that will be encountered in use of the equipment. This practice, in the absence of systems for regulating the fluid flow in accord with the demands of the equipment, leads to excessive operating costs and unnecessary noise pollution. Apart from this, the deposition of dust on electronic equipment is a factor of importance, since dust layers retard heat transfer and are deposited at a rate directly proportional to the airflow into contact with the equipment. As such, an unnecessarily short interval between cleaning cycles is encountered in most installations that fail to provide for adaquate fluid flow regulation in accord with the cooling demands of the equipment.

To overcome some of these problems, some systems have been developed and where the motor circuit is interrupted when the air temperature diminishes to a predetermined value. In such systems, the fan ceases to operate and there is a time lag before the fan motor is again energized and responds to a detected area temperature change. During the interim, no area cooling is accomplished. This type of interrupted operation is suitable for some work area cooling applications. However, in electronic equipment cooling applications, an interrupted flow of air is unsatisfactory because the rate of temperature rise for some electronic equipment components is greater than for others, and the sensors used must, for practical purposes, sense area rather than specific component temperatures. Other control systems for fan motors provide for a continuous flow of the cooling media but rely upon varying the resistance in the motor circuit to regulate the motor speed, a practice which fails to diminish the operating costs in accord with the diminished cooling demand. Such systems are also expensive to manufacture and install and are frequently unreliable in their operation.

SUMMARY OF THE INVENTION

Flow regulating systems contemplated by the invention have an electric motor driven fluid impeller and the power delivered to the motor, and thus, its operating speed is controlled by a device for monitoring the velocity head of a stream of fluid delivered by the impeller. The monitoring device includes a dynamic fluid flow force sensing component which is movably deflected by the velocity head of the flowing fluid, and it also includes a device for detecting the positions assumed by the force sensing component and controlling a circuit for regulating the power delivered to the motor.

Certain aspects of the invention contemplate a means for detecting temperature changes in the flowing fluid and for also controlling the power regulating circuit in accord with the detected temperature changes. In preferred practice, the response of the temperature sensor to changing temperatures is used to modify the movements of the velocity head sensor so that the response of the force sensor position detecting device introduces a power controlling factor in the regulation of the motor circuit and which accounts for both velocity head and temperature changes.

The fluid force or velocity head sensor of the monitering device has a null position it assumes in the absence of a velocity head and provisions are made for applying a biasing force to the force sensor which resists deflective movements of the sensor from its null position under the velocity head of the flowing fluid. This biasing force may be exerted by gravity, simple spring components or by means atributable to the resilient nature of the force sensor structure. On the other hand, preferred practice in accord with the invention is to utilize a temperature responsive spring component for biasing the force sensor against the applied velocity head since the applied bias in such cases is then related to the fluid temperature. As such, the response of the force sensor position detector introduces a power controlling factor to the circuitry and which accounts for both velocity head and temperature changes. As an alternative to the use of a seperate temperature responsive spring biasing component, the force sensor may be made from bimetallic materials with differing temperature coefficients of expansion so that the force sensor and temperature sensor have common structure and the movement of the force sensor reflect both fluid force and temperature changes.

Certain aspects of the invention contemplate the introduction of a temperature change factor into the movements of the force sensor by varying the velocity of the fluid flowing into contact with the force sensor in accord with changing temperature conditions. Still other aspects of the invention contemplate an introduction of a temperature change factor into the velocity head monitoring system by imparting movements to the force sensor position detecting device in response to changing temperature conditions, as will be subsequently seen.

In accord with the invention, various fluid flow force sensing components may be used, the simplest being a vane type structure that is pivotally mounted for downstream deflection under the velocity head, or a vane type structure that is rigidly mounted at one end but at the other end is resiliently deflectable under the impact of the velocity head. Another aspect of the invention contemplates the use of a pivotally mounted airfoil for sensing the velocity head.

Control of the speed regulating system of the invention is based upon supplying power to the motor in response to the movements of the velocity head sensor and in accord with certain aspects, a simple power circuit is utilized and the motor is energized and deenergized as the force sensor moves into and out of its null position. In this case, the positions assumed by the force sensor may be detected through the use of a pair of simple switch contacts that make and break the power circuit by movement of one of the contacts with the force sensor and relative to the other contact. Operationally, in such case, full or a high level of power is applied to the motor when the switch contacts close the motor circuit so that the motor accelerates and causes a velocity head that overcomes the biasing force on the sensor. When this happens, the sensor is deflected from its null position and the switch contacts move apart so that the circuit is open and the applied power is removed or reduced in level. This causes deceleration of the motor and the velocity head on the sensor accordingly diminishes as the biasing force returns the sensor to its null position, and whereat the switch contacts again close the circuit and the motor again accelerates. This making and breaking of the circuit continuously repeats itself and the motor speed stabilizes out in a narrow speed range in which it continuously accelerates and decelerates to provide an average velocity head which is commensurate with the biasing force.

Normal switch contacts have a tendency to fuse under the arcing that transpires as they close and open, and in accord with the preferred practise of the invention, the force sensor position detecting device takes on the form of a light emitting and light detecting device with component that are so arranged that the emitted light is interrupted by the movements of the force sensor. In accord with certain aspects of the invention, the light detector may be an electronic switching device such as a phototransistor that is conductive so long as the light detected exceeds a threshold value, and is otherwise nonconductive when the light detected falls below the threshold value. This type position detector may be used in place of a simple switch contact to make and break the motor power circuit but preferred practice, when using this type switching device, is to use the phototransistor response to control the output of an R-C circuit that in turn, is arranged to control the power delivered to the motor in accord with the voltage lag in the R-C circuit output. In this arrangement, a high level of power is delivered to the motor when the phototransistor is conductive and a lower level is delivered when the phototransistor is rendered nonconductive by the movements of the force sensor.

Other aspects of the invention having to do with the use of light detecting and light emitting components involve the use of a light responsive variable resistor such as a photocell for detecting the force sensor position. In this case, the resistance of the photocell circuit varies in accord with the force sensor movements and the variance in the resistance is used to control the output voltage of an R-C circuit that in turn varies the power delivered in accord with the voltage lag in the R-C circuit, as will be subsequently seen.

The light emitting component of the position detecting device may take on several different forms including simple D-C operated light emission elements. On the other hand, it has been found that a simple neon gas discharge light source may be used, and this has the advantage of using an A-C power source so that A-C rectifier circuit components may be avoided in the circuitry.

Other aspects of the invention will be evident from the following and include among other things, a device for regulating the motor speed and which may be conveniently mounted in the flow path of the fan delivered air stream.

A general object of the invention is to provide improved fluid flow regulating systems for fluid pumping devices and particularly for forced air cooling devices. One particular objective is to provide a system for regulating the airflow from fans or blowers and which will reduce the overall noise pollution attendant the use of such devices in forced air cooling applications with normal cooling demands that are less than the capacities of the devices. Yet another objective is to provide an improved motor speed control system for forced air cooling fan or blower applications where the cooling requirements vary from a norm and wherein objectionable dust deposition in the area can be reduced by regulating the fluid flow in accord with current cooling demand levels rather than by continual operation at the maximum cooling demand level. Yet another objective is to provide improved fluid flow regulating systems for forced air cooling insulations and which reduce the operating costs to satisfy the cooling demands. Another objective is to provide an improved means for controlling the motor speed of a forced air fan and which avoids the use of mechanical switching devices. Still another objective is to provide a system and device of the kind contemplated and which is inexpensive to manufacture and avoids the need for using current rectifier components. Other and further objects will be apparent from the disclosure which follows.

BRIEF DESCRIPTION OF THE DRAWINGS

The novel features which are believed to be characteristic of the invention are set forth with particularity in the appended claims, the invention itself, however, both as to its organization and method of operation, together with further objects and advantages thereof, may best be understood by reference to the following description taken in connection with the accompanying drawings, in which:

FIG. 1 is a side elevational view of an embodiment of the invention with certain parts broken away and others schematically illustrated;

FIG. 2 is a top view of a fragment of a device seen in FIG. 1, as taken along the lines 2—2 thereof;

FIG. 3 is an end elevational view taken generally along the lines 3—3 of FIG. 1;

FIG. 4 is a side elevational view of yet another embodiment of the invention with certain parts being broken away and others diagramatically illustrated;

FIG. 5 is a top plan view of a fragment of the device seen in FIG. 4 and as seen along the lines 5—5 therein;

FIG. 6 is a vertical section taken generally along the lines 6—6 of FIG. 4;

FIG. 7 is a side elevational view of yet another embodiment of the invention with certain parts being broken away and other schematically illustrated;

FIG. 8 is a top plan view of a fragment of the device seen in FIG. 7, and as taken along the lines 8—8 therein;

FIG. 9 is an enlarged sectional view of a fragment of the device seen in FIG. 8 and as taken along the lines 9—9 therein;

FIG. 10 diagramatically illustrates an electronic component installation that is equipped with an embodiment of the invention that is more particularly illustrated in FIGS. 11 thru 16;

FIG. 11 is a side elevational view of a component of the flow regulating system depicted in FIG. 10 with certain parts shown in section and other parts broken away;

FIG. 12 is a sectional view taken generally along the lines 12—12 of FIG. 11;

FIG. 13 is an end elevational view taken generally along the lines 13—13 of FIG. 11;

FIG. 14 schematically illustrates the motor circuit associated with the control system depicted in FIG. 10;

FIG. 15 is a section taken generally along the lines 15—15 of FIG. 11;

FIG. 16 is a top plan view of certain components as seen along the lines 16—16 in FIG. 11 and with certain parts broken away;

FIG. 17 diagramatically illustrates an electronic component installation which is equipped with a preferred embodiment of the invention that is more particularly illustrated in FIGS. 18 thru 24;

FIG. 18 is a top plan view of a component of the flow regulating system depicted in FIG. 17 with certain parts being shown in broken lines;

FIG. 19 is a front end elevational view of the component seen in FIG. 18 and as seen along the lines 19—19 therein;

FIG. 20 is a side elevational view of the components seen in FIG. 18 with certain parts of the housing structure broken away to expose the interior components;

FIG. 21 is a vertical section of the component as seen generally along the lines 21—21 of FIG. 20;

FIG. 22 is a sectional view of a fragment of the device as seen along the lines 22—22 of FIG. 20;

FIG. 23 is a sectional view taken generally along the lines 23—23 of FIG. 22;

FIG. 24 is a circuit diagram illustrating the relation of the power regulating circuit to certain components illustrated in the embodiment shown in FIGS. 17 thru 23;

FIG. 25 schematically illustrates yet another embodiment of the invention;

DESCRIPTION OF EMBODIMENTS

Figure 26:
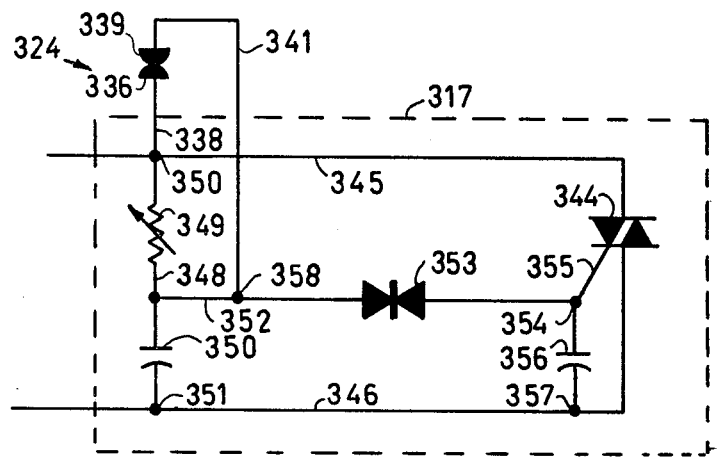
FIG. 26 is a circuit diagram illustrating the power regulating circuit used in the embodiment shown in FIG. 25 and its relationship to certain switch components shown therein.

Reference is now made to the drawings and more particularly to the flow regulating system illustrated in FIGS. 1-3. The system 10 for regulating the speed of the fan motor 11, and thus, the flow of air from the fan, includes a monitoring device 8 for monitoring the velocity head of the air stream provided by the impeller 14. This monitoring device 8 includes an airflow force or velocity head sensing member 12 that is movably deflectable under the influence of the velocity head and a device or component 29 for detecting the positions assumed by the force sensor 12 and controlling the operation of the motor circuit.

The force sensor is shown as mounted in the flow path 13 for the main air stream developed by the fan impeller 14, and the fan 15 is mounted on a rigid structural member 16 that extends downstream from the fan to serve in supporting a bracket 17 that is fixed to the structure by means of screw elements 18. Bracket 17 has a lateral extension 19 with an integrally formed upright extending post 20. Post 20 serves as a mount for an adjustable device 21 for biasing the force sensor 12 against the velocity head or dynamic airflow forces that are imparted to the sensor 12. At the upstream side of the extension 19, bracket 17 is equipped with an electrically nonconductive plastic block 23 that is fixed to the extension 19 by a screw element 24 to electrically isolate the member 12 from the supporting bracket.

The force sensor 12 is shown in the form of a resiliently bendable, rectangular metal vane component that is arranged transversely of the flow path. The vane component is equipped with a depending leg 25 that extends into a slot in block 23 and where the leg is clamped in place by a screw element 24. Leg 25 is electrically connected to an electrical lead contact 26. The resilient nature of the force sensor 12 permits it to bend under the airflow forces 22 imparted to the sensor at its upright or null position 27 and to a deflected position, such as designated at 28.

The device 29 for detecting the relative movements and positions assumed by the force sensor 12 in response to the airflow forces 22 is shown in the form of a pair of electrical switch contacts 30 and 31 that are connected in the power circuit 32 of the motor. Contact 30 is mounted on an electrically conductive metal post 33 that is fixed upright in an appropriate slot in block 23, and clamped in place by a screw element 24. Post 33 is electrically isolated in the mounting from the sensor leg 25 and is electrically connected at its lower end to a lead contact 34. Contact 30 is electrically connected through the metal post 33, lead contact 34 and lead line 35 to one side of the induction coil of motor 11 and in series arrangement with an A-C power source 36.

The other switch contact 31 of device 29 is mounted on the force sensor 12 and in working alignment with contact 30. Contact 31 moves with the force sensor when the latter is deflected from its null position. This contact 31 is electrically connected to the other side of the induction coil of motor 11 through member 12, lead contact 26 and lead line 37. Lead line 37 has a single pole, single throw control switch 28 which is manipulatable to close the circuit so as to initiate operation of the fan and control system.

The position sensing device 29 serves to detect the presence of the force sensing member in the upright or null position it assumes in the absence of airflow along path 13. In this position 27, switch contacts 30 and 31 are in engagement so that circuit 32 is completed and the motor is energized when the control system is operational and switch 38 is closed. When member 12 moves out of its null position 27, as to its deflected position 28, contact 31 is carried with the member and the force responsive movement of the sensor to the deflected position is detected as contact 31 disengages contact 30 and opens the motor circuit. Thereafter, as the velocity head sensor returns to its null position 27, the return movement is detected as the switch contacts engage and once again energize the motor circuit.

The resiliency of the force sensor 12 may be relied on in some applications of the invention to provide the biasing force which opposes the deflected movement of the member 12 under the velocity head 22 of the air stream. Under such circumstances, the forces 22 required to bend member 12 and thus to break circuit 32, will be solely determined by the resilient nature of the member. Such an arrangement, although serving to control the motor speed at a range level that is determined by the physical properties of the resilient member, nevertheless, lacks the adjustable features desired for regulation of the motor speed at a higher or lower level than that determined by the resilient nature of the member.

Device 21 provides a means for adjusting the biasing force on the sensor. This device 21 includes a compression spring 39 which is coiled about one end of a threaded screw element 40 that is threadedly engaged in a post 20. Spring 39 is arranged between a collar 41 on screw element 40 and the downstream side of the force sensor 12. This spring 39 may be compressed between the collar and sensing member 12 by manipulating the screw element 40 so as to increase or decrease the biasing force applied to the sensor. Spring 39 is electrically isolated from member 12 at its point of contact therewith, by means not shown.

Operationally, it should be understood that if the biasing force that resists the sensor movement out of its null position 27 is greater than the velocity head 22 applied to the upstream side of the force sensor 12, as when the motor is operating without interruption and at its continuously energized operating speed, the speed control system 10 is rendered inoperative. On the other hand, when the biasing force is adjusted to a level below the velocity head 22 that may be generated by the fan at its continuously energized operating speed, the control system then becomes operational.

Assuming that the biasing force on the sensor 12 is at a level below the velocity head capable of being developed by the fan, operation of both the fan and the control system may be initiated by closing switch 38. This completes the motor circuit through the closed contacts 30 and 31 and energized motor 11. As the speed of the motor 11 increases under the power delivered from the A-C source 36, the velocity head force 22 applied to the force sensor 12 progressively increases. When the velocity head 22 exceeds the biasing force determined by the adjustment of the spring carrying screw element 40, the force sensor 12 movably reacts and is deflected out of its null position 27 in a downstream direction. As this transpires, switch contact 31 disengages contact 30 and circuit 32 is opened so that the motor is applied to the impellor 14 and momentarily, the inertia of the rotating parts causes continued acceleration so that the motor reaches a speed slightly above that at which the biasing force was initially overcome. This produces a velocity head 22 which is slightly in excess of the biasing force that serves to maintain the sensor in the null position 27, and it causes the sensor 12 to assume a force responsive position such as designated at 28 and at which point the velocity head is equalized by the increased biasing force that accompanies the compression of the spring. Once acceleration is overcome by mechanical and fluid resistance to the movements of the rotating parts, deceleration transpires and the velocity head 22 diminishes, thus permitting the spring 39 to urge the force sensor 12 back into its null position 27. As this happens, contact 31 again engages switch contact 30 to complete the circuit connection between the motor and the power source 36. With the motor once again energized, torque is applied to the impeller 14 and acceleration continues until the velocity head 22 again reaches the point at which the spring biasing force is overcome and the sensor is again deflected out of its null position. Thereafter, the sequence of events leading to the deenergizing and energizing of the motor 11 cyclically repeat themselves. Thus, in the normal operation of control system 10, the motor circuit 32 is cyclically completed and broken through the circuit making and breaking movement of switch contact 31. As such, the motor is also cyclically energized and deenergized so that the rotating parts accelerate and decelerate through a speed range productive of airflow forces on the sensing member 12 which range from slightly below to slightly above the biasing force that maintains the force sensor in its null position.

The control system depicted, serves to regulate the speed of the motor within a close range that is determined by the biasing force on sensor 12 and there is a continuous flow of fan delivered air since the system is so designed that the impeller continues to rotate and thus produce an airflow during the intervals when the motor is deenergized. By manipulating the screw element 40 to increase the biasing force that retains the member 12 in its null position, the speed range at which the motor is regulated by the control circuit 32 is correspondingly increased as is the flow rate from the fan. Similarly, by manipulating the screw element 40 to diminish the biasing force on member 12, the speed range at which the motor is regulated is decreased.

Reference is now made to the embodiment illustrated in FIGS. 4–6. Here, the control system 45 by regulating the airflow from fan 46 has a velocity head monitoring device 42 that includes a force sensing member in the form of a cambered airfoil 47. The airfoil may be made from light plastic material or other suitable material and is mounted in the path 48 of the main air stream produced by the fan impeller 49, the impeller 49 being drivingly connected and mounted on the shaft (not shown) of a shaded pole motor designated at 50.

The airfoil type velocity head sensor 47 has a cambered upper surface that extends between the leading edge 51 and trailing edge 52 of the airfoil. As seen in the drawings, the force sensing member 47 is arranged transversely of the air stream and is mounted for pivotal movement on a metal shaft 53 that is journaled at its opposite ends in a pair of bushings 54A and 54B. These bushings are transversely aligned and supported on a pair of upright metal posts 55 and 56. Fan 46 is mounted on a structural member 57 that extends downstream from the fan impeller, and the airfoil member 47 is supported on a plate-like metal bracket 58 which is fastened to member 57 by means of screw elements 59. Metal posts 55 and 56 are fixed upright on bracket 58 by means of bolt-type fasteners 60 and 61. These metal posts are electrically isolated from the bracket by means of an intervening slab 62 of electrically nonconductive plastic material and the bolts 60 and 61 are also electrically isolated from the bracket 58 by means of nonconductive flanged sleeves 63.

The pivot axis established by shaft 53 for pivotal movement of the force sensor 47 is offset forwardly toward the leading edge 51 from the center of lift for the airfoil 47 so that the resulting velocity head forces 64 applied to the foil tend to pivotally deflect the airfoil in a counterclockwise direction as viewed in FIG. 4.

Airfoil 47 is seen in FIG. 1 in the null position 65 is assumed in the absence of a velocity head. When a velocity head 64 of sufficient magnitude is imparted to the sensor 47, the sensor 47 is pivotally deflected to a normal flight or force responsive position, such as designated at 66. At the downstream end of bracket 58, the bracket is provided with a bent section 67 which projects vertically at the side of the airfoil and overlaps the trailing edge 52 at a point somewhat above that assumed by the trailing edge at position 66 so as to thereby limit counterclockwise pivotal movement of the airfoil about the axis of shaft 53.

The position detecting component 60 of the monitoring device 42 is again shown in the form of a pair of electrical switch contacts 69 and 70. Contact 69 is mounted on the underside of a metal arm 71 which projects over the leading edge 51 of the airfoil and is fixed to the upper end of post 56 by means of a fastener 72. Arm 71 has an upright extending integrally connected electrical lead contact 73, and the arm is electrically isolated from bolt 72 and post 56 by nonconductive members 87. Contact 69, through arms 71 and lead contact 73 is electrically connected to one side of the fan motor 50 by means of lead line 74.

Switch contact 70 is mounted on the upper cambered surface of the airfoil 47, adjacent to the leading edge 51, so that it moves with the force sensing member between positions 65 and 66 and is arranged in working alignment with switch contact 69. Contact 69 also serves a stop function and limits clockwise movement of the airfoil about the axis of shaft 53. Contact 70 is electrically connected by an internal lead 75 to metal shaft 53 and through bushings 54A, spring type biasing device 81, post 55, bolt 60, a lead contact 76 fixed to bolt 60, and lead line 77 to the other side of motor 50. Lead line 77 has an A-C power source 78 and a single pole, single throw control switch 79 which are connected in series in the motor circuit 80 and in line 77 as seen in FIG. 4.

The position detecting device 68 serves to detect the airfoil in its null position 65 and when this position is detected, the contact 69 and 70 are engaged so that the motor circuit is completed and the motor 50 is energized. When the force sensor 47 pivotally moves counterclockwise (see FIG. 4) out of its null position 65 and to the normal flight or force detecting position 66 in response to a velocity head 64, switch contact 70 disengages contact 69.

The gravitational force acting on airfoil 47 and tending to pivot it in a clockwise direction, as seen in FIG. 4, may be relied on in some applications of the invention to provide a biasing force which opposes reactive movement to the velocity head. However, such an arrangement would more or less limit the mounting of the force detector to installation where the air stream is generally horizontally directed. This would also fail to provide a means for adjusting the biasing force to facilitate changes in the speed level of operation of the motor. Accordingly, the embodiment illustrated also has an adjustable biasing device 81. The device 81 includes a metal hair spring 82 which is coiled about shaft 53 between post 55 and airfoil 47, and which is fixed at its inner end to shaft 53. The outer end of spring 82 is fixed to one end of a metal arm 83 that is mounted for pivotal movement about the axis of shaft 53 and on the collar of bushing 54A. Post 55 has a plate like extension 84 that is equipped with an arcuate slot 85. Arm 83 is fixed to the extension 84 by means of a clamping type fastener 86. By releasing fastener 86 and moving arm 83, the biasing force on airfoil 47 may be adjusted to either increase or decrease the resistance to deflection of the airfoil from its null position.

Assuming the arm 83 to be adjusted to provide a predetermined biasing force upon the airfoil member 47 which is less than the resulting force 64 capable of being generated by the fan motor, operation of the fan and of the control system may be initiated by closing switch 79 to energize the motor circuit 80. This closes circuit 80 and the fan impeller 49 accelerates under the torque supplied by the accelerating motor 50. As such, the velocity head on foil 47 increases under the increasing flow of air in the air stream. When the resulting velocity head 64 exceeds the biasing force determined by the adjustment of the hair spring 82, the force sensor 47 pivots counterclockwise, as seen in FIG. 4, and assumes the flight position 66. As this happens, and the airflow 47 pivots out of its null position 65, switch contact 70 disengages contact 69 to open the circuit and deenergize the motor. This removes the torque from the impeller 49 while acceleration continues momentarily under the inertia influences of the rotating parts so that the motor 50 attains a speed slightly in excess of that at the time the biasing force was overcome. Thereafter, deceleration takes place and the velocity head starts to diminish. As such, spring 82 starts to urge the airfoil 47 back into its null position 65, and as the airfoil 47 returns to this position 65, contact 70 again engages contact 69 so that the motor circuit 80 is again closed and the motor is energized. With the motor once more energized, torque is again applied to the impeller 49 and the rotating parts again start to accelerate. During such acceleration, the resultant force 64 on foil 47 builds up to the point at which the hair spring biasing force is again overcome, and the sequence of events leading to the deenergizing and subsequent energizing of the motor 50 continue to cyclically repeat themselves.

System 45 serves to intermittently deenergize and energize motor 50 as the velocity head rises above and falls below that of the biasing force applied by spring 82. During this intermitent application of driving torque to the fan impeller 49, the motor speed is regulated by the system to within a close range that is determined by the biasing force applied to the foil. Again, there is a continuous flow of air from fan 46 as the motor speed is being controlled by the system since the motor is always energized if the air stream is incapable of providing a force that is sufficient to overcome the biasing force applied to the airfoil.

The use of an airfoil as the force sensing member has the advantage that the movements of the airfoil are extremely sensitive to the flow of the air stream so that the speed range encountered, when the motor is being controlled in accord with the deenergizing and energizing process, may be held to within close tolerances.

Reference is now made to the embodiment shown in FIGS. 7-9 and wherein the control system 98 for regulating the forced air fan 91 has a velocity head monitoring device 89 that includes a force sensing member which is similar to that shown in the previous embodiment with minor modifications to provide a somewhat different arrangement for the position detecting component 93 of the device 89. Fan 91 here, includes a capacitor start motor 94 which drives an air impeller 95 that produces an air stream 96. Motor 94 is mounted on a structural member 97 and the motor speed is regulated by the control system.

Control system 98 includes a force sensor 92 in the form of an airfoil and which is mounted in the flow path 96 for the main stream of airflow from the fan. Airfoil 92 has a cambered upper surface that extends between its leading edge 99 and its trailing edge 100. The airfoil is also arranged transversely of the air stream and is mounted for pivotal movement on a metal shaft 101 which is journaled at its opposite ends in a pair of bushings 102 and 103. These bushings are axially aligned and are supported on a pair of metal upright posts 104 and 105. These posts are mounted on a plate-like bracket 106 which is fastened to the structural member 97 at a point downstream from the impeller by means of fasteners 107. The posts are also electrically isolated from the metal bracket 106 by means of a slab 108 of electrical insulation material. The fastener 109 for post 104 is electrically connected to post 104 and carries a lead contact 110 which is electrically isolated from the bracket by means of a flanged sleeve insulator 111.

Shaft 101 is forwardly offset from the center of lift for the airfoil so that the airflow forces 112 applied to the airfoil tend to pivot the airfoil in a counterclockwise direction, as seen in FIG. 7. The adjustable biasing device 115 serves to maintain the airfoil in its null position 113 until the flow forces 112 overcome the biasing force and at which point the foil assumes its force responsive normal flight position 114.

The position sensing device 93 for detecting the reactive movements and positions assumed by the airfoil 92 is again shown in the form of a pair of electrical switch contacts 116 and 117. Contact 116 is mounted on the upper surface of a metal arm 118 which overlies the trailing edge 100 of foil 92 and has a depending leg 119 that is integrally connected at the right side of the airfoil to the underlying bracket 106. Switch contact 116 is electrically isolated from the metal arm 118 but electrically connected by a fastener 120 to a lead contact 121 that is, in turn, by lead 122, electrically connected to one side of motor 94. Lead 122 contains a single pole, single throw switch designated at 123. Leg 119 has a peg 124 which underlies arm 118 and overlies the trailing edge at a point slightly above that assumed by the trailing edge at the normal flight position 114. This peg 124 serves as a stop to limit counterclockwise movement of the force sensor, as is evident in FIG. 9.

Contact 117 is mounted on the underside of a rearwardly extending metal arm 125 that is fixed to and movable with the airfoil by means of a metal fastener 126. As thus arranged, contact 117 is in moving working alignment with contact 116. Fastener 126 is electrically connected to shaft 101 by means of an internal lead 127 in airfoil 92 and, through the spring biasing device 115, post 104, fastener 109, lead contact 110 and lead line 112, is electrically connected in the circuit 130 to the other side of the motor. Line 128 has an A-C power source designated at 129.

The position detecting device 93 serves to detect the position of the airfoil type velocity head sensor 92 when the latter is in its null position 113. Under such circumstances, switch contacts 116 and 117 are engaged so that the motor circuit 130 is energized and torque is applied to the impeller 95. On the other hand, when the airfoil 92 is pivotally moved and is deflected counterclockwise out of its null position 113 in response to the applied velocity head forces 112, contact 117 disengages contact 116 so that the absence of the airfoil from position 113, and thus, its presence in the flight position 114, is detected by the opening of the motor circuit 131 and the resulting deenergizing of the motor.

The adjustable biasing device 115 in the embodiment shown in FIGS. 7-9 is like that shown in the previous embodiment. Thus, the device includes a hair spring 131 which is wound around and fixed to the shaft 101 at its inner end while the outer end is fixed to one end of a pivot arm 132. Post 104 also has a rearward extension 133 with an arcuate slot 134. Here, the arm 132 is clamped to the extension 133 by a clamping-type fastener 135 which is carried by the arm and can be released from clamping engagement with the extension 133 so that the arm can be pivoted to vary the biasing force on shaft 101 and thus, on the force sensing airfoil 92.

Operationally, it may be assumed that arm 132 is adjusted to provide a clockwise biasing force on airfoil 92 which is less than the airflow forces 112 that are developed by the impeller when the motor is operating at its continuously energized full speed of operation. Under such circumstances, with the closing of switch 123, the motor circuit 130 is completed so that full power is delivered to the motor 94. This applies torque to impeller 95 and, as the fan impeller 95 accelerates with the increasing motor speed, the velocity head forces 112 acting on an air foil 92 also increase. When these airflow forces 112 exceed the biasing force determined by the adjustment of the hair spring 131, the force sensor 92 pivots counterclockwise out of its null position 113 and into the force responsive flight position 114. As this happens, switch contact 117 disengages contact 116 and an open circuit deenergized motor circuit condition is established. This, of course, removes the torque from impeller 95 and acceleration continues momentarily under the inertia influences of the rotating parts so that the motor 94 attains a speed slightly in excess of that at the time the biasing force was overcome. Thereafter, deceleration takes place and the velocity head forces 112 diminish. As the forces diminish below the level of the biasing force, spring 131 starts to urge the airfoil back into its null position 113. As the airfoil returns to this position 113, contact 117 again engages switch contact 116 so that the motor circuit 130 is again completed and the motor is accordingly energized. With the motor once more energized, torque is again applied to impeller 95, and the rotating parts again start to accelerate. During such acceleration, the forces 112 on the airfoil again start to build up to the point at which the hair spring biasing force is overcome, and the sequence of events leading to the deenergizing and subsequent energizing of the motor continue to cyclically repeat themselves. Throughout the operation of the motor under the control of the system, the fan impeller continues to rotate so that there is again a continuous flow of air from the fan at all times and regardless of the energized or deenergized condition of the motor.

Reference is now made to FIGS. 10-16 and wherein another embodiment of the invention is shown as forming part of an electronic equipment installation 140 that is equipped with a forced air system 141 for cooling the electronic components 142.

The electronic components 142 (see FIG. 10) are appropriately mounted and housed in a casing 143 that has an air inlet port 144 in one end wall and an air outlet port 145 in the opposite end wall. The fan 146 of the cooling system 141 is mounted in the inlet port 144 and an internal baffle 147 is provided to deflect a portion of the air stream over a lower tier 148 of the electronic components, while another portion of the main air stream passes over the upper tier 149. Fan 146 draws air at ambient conditions into the casing 143 through port 144 and the air, as heated by that dissipated by the components, is discharged through outlet port 145. The fan 146 has a shaded pole motor 150 which is drivingly connected to the impeller 151.

The speed control system 152 for regulating the motor speed and the airflow across the components in this instance includes a device 137 for regulating the motor speed in accord with detected changes in the velocity head as well as changes in the temperature of the air stream. This device 137 has a velocity head monitering component 138 with a force sensor 153 that is housed in an open ended housing 15:. It also includes a device 155 for regulating the airflow though the housing 154 and which responds to the temperature changes in the air being discharged from casing 153.

The housing component 154 of the motor speed regulating device 137 is mounted in the path of the air stream being forced over the upper tier 148 and is so arranged that its front or inlet opening 156 faces upstream of the airflow while the rear or discharge opening or port 157 faces downstream. This permits a portion of the air stream to pass along a flow path through the housing 154 and then rejoin the main stream of flow over the upper tier at the downstream end of the housing. Housing 154 has opposite side walls, 158 and 159, and top and bottom walls, 160 and 161. At the front end, the housing is equipped with a rectangular shutter 162 for deflecting airflow from the housing. The shutter is mounted for pivotal movement about axially aligned stub shafts 163 and 164 so as to limit and regulate the flow through the housing in response to rising temperature changes. Shafts 163 and 164 are journaled in the opposite side walls 158 and 159 respectively. Shutter 162 is arranged to pivot between the fully open position 165 and a fully closed position 166. At the fully open position 165, shutter 162 rests on a ledge 167 that extends between the side walls at the base of the front opening 156. At closed position 166, shutter 162 engages a stop member 168 which extends between the side walls 158 and 159 and depends from the top wall 160 in the interior of the housing.

The axis 169 of pivotal movement of the shutter is offset from the bottom wall 161 to accommodate the location of a lug 170 that is integral with the shutter and used in pivoting the shutter toward its closed position 166. Shutter 162 is constantly subjected to a biasing force urging it into the open position 165, the force being provided by a spring element 171 that is coiled about the stub shaft 163 adjacent to wall 158. One end of spring 171 engages the upper surface of a ledge 172 that is located internally of the housing and extends between the opposite side walls 158 and 159. The other end of spring 171 encounters the upper face of the shutter 162 as seen in the drawings, so that the shutter is constantly being biased into the open position 154. Ledge 172 is located rearwardly of the shutter and the structure therebelow serves, among other things, to obstruct the flow of air beneath the shutter.

In addition to the shutter 162, the airflow regulating device 155 includes a bellows 173 which is mounted in the housing and a temperature sensing component 174 which is approximately mounted in the casing 143 adjacent the air outlet port 145. The temperature sensing component 174, in the illustration, is shown in the form of a hollow cylinder which is connected to the bellows by a capillary tube 175 and contains an appropriate temperature responsive expandable fluid. The bottom wall 161 of the housing has a block 176 that is fixed upright on the wall, generally intermediate the side walls 158 and 159. The rear end of the bellows 173 is fixed to the block by a pair of threaded nuts 177. The front end of the bellows is fixed to an elongated probe 178 which extends through the member 172 and is aligned in movement with lug 170 so that when the bellows expand under the influence of a temperature rise, for example, to the expanded position, designated at 179, from its normal position 180 under normal ambient conditions, the end 181 of the probe encounters the lug 170 and pivots the shutter to its closed position 166 against the urgings of spring 171. Lug 170 has a cam surface 182 and is so arranged that if the bellows expand beyond that required to move the shutter to its fully closed position 166, the proe 178 passes under the lug without causing further movement of the shutter, but while nevertheless maintaining the shutter in its closed position.

The bellows 173 and cylinder 174 are filled with a suitable fluid which has a temperature coefficient of expansion over the desired range so that, as the temperature rises at the outlet port 145, the fluid expands and causes expansion of the bellows and hence, pivotal movement of the shutter toward its closed position. Conversely, as the temperature conditions at the outlet port 145 diminish, the liquid contracts, as does the bellows, to permit the shutter to move toward the open position 165 under the urgings of spring 171.

The force sensing member 153 of the monitoring device 138 in the illustrated embodiment is again shown in the form of an airfoil which has a cambered upper surface that extends between the leading edge 187 and the trailing edge 184 of the force sensing member 153. The airfoil is arranged transversely of the airflow path 185 through the housing 154 and is mounted for pivotal movement on a shaft 186 that is located slightly forwardly of the center of lift of the airfoil member 153. Shaft 186 is journaled at its opposite ends in bushings 187 and 188 is in turn, mounted in the opposite side walls 158 and 159 respectively. At the null position 189 for the force sensor 153, the trailing edge is adapted to rest on a transversely arranged ledge 191 at the bottom of the rear openings, and when the resultant velocity head 192 applied to the airfoil is sufficient to overcome the biasing force, the foil pivots to its normal flight position 190. Housing 154 has another ledge 193 at the top end of the rear opening 157. This ledge 193 may be encountered by the airfoil to limit clockwise movement of the force sensing member.

The biasing device 194 is again shown in the form of a hair spring 195 which biases the airfoil to pivot in a clockwise direction (FIG. 11) and which can be adjusted to movement of a pivot arm 196. The spring 195 is coiled about shaft 186 adjacent side wall 158 and is fixed at its inner end to shaft 186. The outer end of the spring, on the other hand, is fixed to one end of the pivot arm 196, and this arm 196 is mounted for pivotal movement on the inside collar 197 of bushing 187. The other end 198 of arm 196 is outwardly bent and projects through an arcuate slot 199 in the side wall 158 to facilitate manual adjustment of the arm from the exterior of the housing and thus, the biasing force on the foil. The arm is releasably fixed to the wall in its adjusted position by means of a clamping screw element 200 carried by the arm 197 and which may be manipulated from the exterior of the housing to facilitate relocation of the arm 196 and hence, adjustment of the biasing force on the force sensing member 153.

The device 201 for detecting the positions of the force sensor is connected to and controls a circuit 202 for regulating the power delivered to the motor and which is connected to an A-C power source 203 and a manually controlled single pole, single throw switch 204 in the fan motor circuit 205. One side of circuit 202 is connected by lead 206 through switch 204 to one side of the motor while the other side of the circuit 202 is connected by lead 207 through the A-C power source 203 to the other side of the motor 150.

Circuit 202 operates under the control of a light detecting element 208 of the position detecting device 201 and it is arranged to detect light from a light emitting element 209. The detecting and emitting elements 208 and 209 are mounted internally of housing 154 above the rear opening 157 and in a slotted plastic mount 210 that is fixed to a depending rear wall section 211 above ledge 153 by bolt type fasteners 212. The slot 213 in mount 210 is arranged to accomodate the movements of a light interrupting probe 214 that is fixed to and movable with the airfoil 153. Probe 214 is so arranged, when the airfoil is at the null position 189, that is interrupts the light from emitter 209. Under such circumstances, the circuit 202 is controlled by the response of the light detector to complete the power circuit 205 so that motor 150 is energized. On the other hand, when the force sensor 153 moves out of its null position 189, probe 214 also moves out of the slot 213 so that the light emitted from light emitter 209 is detected by the light detecting element 208. The light detector response, under such circumstances, controls circuit 202 to provide an open circuit condition so that the motor circuit is thereby deenergized. The position detecting device 201 serves to detect the airfoil in its null position by interrupting light between elements 208 and 209 and serves to detect the absence of the foil from this position 189, and thus, its presence in the normal flight position, by the detection of the light from the emitter 209.

In calibrating the speed control system 152 for the equipment installation 140, the bellows mounting is adjusted by the manipulation of nuts 177 so that the end 181 of probe 178 encounters the lug 170 at the open position 165 of shutter 162 when the temperature sensed by the sensor 174 is at that temperature desired at the outlet port 145 to reflect the desired cooling under normal operation of the control system. With this calibration of the air stream flow regulating device 155, shuter 162 is caused to pivot toward the closed position 166 from its open position 165 only when the air temperature of the outlet port 145 starts to exceed the desired operating temperature and thus, evidences a greater cooling demand.

With the air stream flow regulating device thus calibrated the biasing force on airfoil 153 is adjusted by setting the pivot arm 196 so that under the ambient temperatures and pressures normally encountered, the controlled operating speed range for the fan is such as to provide an average airflow productive of the desired cooling and thus productive of the desired air temperature at outlet 145. With the air stream flow regulating device 155 and the biasing device 194 thus adjusted and calibrated, normal operation of the control system 152 may be initiated by closing switch 204. When this happens, the motor circuit 205 is completed and motor 150 is subjected to line voltage and thus, energized. As such, motor 150 applies torque to impellor 151 and, as the rotating parts accelerate, air passes through housing 154 by entering the front opening 156 and discharging through the rear opening 157. The resulting velocity head 192 on airfoil 153 accordingly progressively build up to the point at which the biasing force of the spring 195 is exceeded by the resultant airflow forces 192. As this happens, the airfoil 153 pivots out of its null position 189 and toward its normal flight position 190. With this clockwise reactive movement of the airfoil to the velocity head of the air stream, probe 14 also pivots out of the slot 213 so that it no longer interrupts the light from the light emitting element 209. Element 208 accordingly, detects the light from source 209 and controls the electronic switching circuit 202 to open the motor circuit 205. When circuit 202 is thus controlled, an open circuit deenergized motor condition is established. The torque applied to the impellor 151 is, accordingly, removed and the rotating parts continue momentarily to accelerate under the influence of inertia, and thereafter, decelerate. As the impellor decelerates, the forces 192 on the airfoil 153 diminish. As they diminish below the level of the biasing force applied by spring 195, foil 153 is urged out of its deflected position 190 and back into its null position 189. As this happens, the light interrupting probe 214 again enters the slot 213 and assumes a light interrupting position between the light emittor 209 and the light detecting element 208. When this happens, the detecting element 208 responds to control the electronic switching circuit 202 to again establish a closed power circuit that energizes the fan motor. This, of course, applies torque to impellor 151 and the fan again accelerates and starts to increase the velocity head and thus the airflow forces on airfoil 153 so that the sequence of events leading up to the deenergizing and subsequent energizing of the fan motor circuit 150 thereafter cyclically repeat themselves with a continuous air stream being provided during the interval between the motor energized conditions.

The operation of the control system as thus far explained, has assumed normal ambient temperature and pressure conditions at the air inlet port so that the motor is controlled at a speed range level sufficient to provide the desired temperature at the outlet port and which would avoid actuation of the air stream flow regulating device 155 in response to temperature changes. As such, shutter 162 has remained in its open position 165 during this normal operation of the system.

If the ambient temperature rises above normal, or if the atmospheric pressure falls below normal, or if the electronic components 142 are subjected to a surge of operation which increases the temperature and thus, the cooling demand on the system, the temperature of the outlet port 143 will rise above the desired operating temperature reflected by the calibration of the temperature sensing component. Under such circumstances, the fluid in sensor 174 will expand, and through the capillary tube connection with bellows 173, will cause the bellows to also expand. This accordingly, pivotally moves the shutter 162 out of its open position 165 and toward its closed position 166 by an angular amount which will depend upon the sensed temperature rise. This will deflect air from the inlet to housing 154 and reduce the airflow through housing 154 and correspondingly reduce the resultant air flow forces 192 on the force sensor 153 below that would normally result when the shutter is in the open positon 165. As such, a greater airflow rate from the fan is required in order to increase the flow of air through the constricted opening to the point at which the airflow forces 192 build up and overcome the biasing force. Consequently, with movement of the shutter toward its closed position in response to a detected temperature rise, the motor is automatically controlled to operate at a higher speed level than that when the shutter is open. This provides a greater airflow over the components and which removes more heat, thus tending to reduce the temperature at the casing outlet. As the sensed temperature diminishes, the bellows contract, and the shutter opens to lower the speed level of operation of the motor until the normal temperature is again detected.

The airflow regulating device 155 basically serves to regulate the fan so that there is an increased flow of air over the components as the sensed temperature conditions reflect an increasing cooling demand due to changing ambient temperatures or pressures, or due to changing heat dissipation demands of the electronic components.

Reference is now made to the preferred embodiment of the invention as seen in FIGS. 17-24. In FIG. 17, a forced air cooling system 225 is shown in conjunction with an electronic device 226 that includes a housing 227 for the electronic components 228. The housing 227 has apertures which form air inlet and discharge ports 229 and 230 for the circulation and flow of air through the interior of the housing for purposes of cooling the electronic components 228. The fan 231 of the cooling system 225 is mounted in the discharge port 230 and serves as an exhaust fan in the depicted system. The fan has an impeller 232 that is driven by an electrically powered motor 233 which is connected to and operated under the control of the motor speed regulating device 234. This device 234 includes a housing 235 that houses the monitoring device 236 for sensing and detecting changes in the velocity head of the fluid delivered by the fan, a device 237 for sensing and detecting temperature changes, and a power regulating circuit 238 that is most particularly illustrated in FIG. 24.

The housing 235 comprises an open sided metal section 239 that forms the top, bottom, front and back walls 240, 241, 242, and 243 of the housing, and a pair of rectangular side wall forming components 244 and 245. These wall components 244 and 245 are made from electrically nonconductive material, such as a suitable plastic, and the housed components of the speed regulating device 234 are mounted on the right side wall 245. The side wall forming components are secured in place and to the metal section 239 by means of a nut and bolt type fastener 246, that clamps the metal section 239 between the side wall components 244 and 245. This arrangement facilitates the assembly and disassembly of the housing.

The front and rear walls 242 and 243 of housing 235 have inlet and outlet port forming rectangular apertures 47 and 248 that are covered by suitable rectangular screens 249 which are held in place by rectangular frames 250 that are glued to the walls 242 and 243 by suitable adhesive material. The screens 249 serve to dampen the airflow through the housing 255 and, of course, also serve to protect the housed components from airborne particles.

As seen in FIG. 17, the speed regulating device 234 is mounted between the inlet and discharge ports 229 and 230 within the main stream of fan delivered airflow through the housing. The inlet and outlet ports 247 and 248 in housing 235 accomodate the flow of a portion of the fan delivered air through the housing component of the speed regulating device.

The monitoring device 236 for monitoring the velocity head of the airflow through housing 235 includes a component 251 for sensing the fluid flow forces or velocity head and is mounted in the flow path 252 for the air passing through the housing 235. It also includes a component 253 for detecting the positions assumed by the force sensor 251 under the influence of the velocity head or fluid flow forces that are imparted to the sensor 251.

As will be subsequently seen, the temperature sensing device 237 is arranged to influence the movements of the force sensor 251 so that the power regulating circuit 238 is controlled by the position detector 253 to regulate the power delivered to the motor in accord with the sensed velocity head and temperature changes. The components of circuit 2 38 are encased in suitable hardened potting material 254 that is fixed to the right side wall 245 of housing 235, as seen in the drawings.

The force sensor 251 is shown in the form of a thin, light-weight rectangular metal vane-type member which is provided with an upper end cutout 269 that leaves a pair of spaced apart, upwardly extending arm forming sections 255 that are bent over a horizontally and transversely arranged rod 256 to provide a pivotal suspension for pivotal movement of the sensor 251 about the rod axis 257.

The opposite ends of rod 256 are mounted in the spaced apart depending legs 258 and 259 of an inverted U-shaped bracket 260 that is fixed to the right side w all 245 by means of a suitable adhesive which secures the adjacent leg 259 to the wall component 245. This rod or shaft 256 also extends through the right wall 245, and at its outer end is equipped with a lever 261 and a sleeve-type friction element 262. The lever 261 enables the rod to be rotatably adjusted to thereby adjust the biasing force on the force sensor 251, as will be subsequently seen, and the friction element 262 serves to frictionally retain the shaft 256 in its position of adjustment.

The temperature sensor 237 is illustrated in the form of a coiled bimetallic hair spring that is coiled about the axis of rod 256 and generally located intermediate its opposite ends, as best seen in FIG. 21. The inner end (not shown) of the spring component 237 is fixed to the rod 256 and thus rotatable therewith when lever 261 is manipulated to adjust the biasing force on the force sensor. As evident in FIGS. 20 and 21, the convolutions 263 of the spring 237 extend through the cutout area 269 of the sensor 251 while the outer end 264 of the spring device 237 is bent and fixed to the back wall 265 of the force sensor. This arrangement permits the spring to move the force sensor in response to sense temperature changes and to exert an upstream directed biasing force 266 that is resistive of the velocity head 303 imparted to the front wall 282. The spring component has a typical laminated arrangement with the inner surface 267 forming component of the spring having a higher temperature coefficient of expansion than the outer surface 268 forming component in the illustration. As such, as the temperature rises, the sensor tends to exert an increasingly greater biasing force 366 that tends to pivot the sensor in the upstream direction and conversely tends to draw the force sensor in a downstream direction in response to diminishing temperature changes.

The position detector 253 comprises a light emitting element 270 that is shown in the form of a neon gas discharge element, and a light detecting element 271 that is shown in the form of a light responsive variable resistor or photocell. These elements 270 and 271 are mounted in an elongated, U-shaped block 272 which is arranged transversely and fixed to the right side wall 245 of the housing 235. This block has an upstream facing slot 273 which is arranged to accommodate the movement of an angle shaped member 274 that serves as a light interrupting probe which is fixed to the back wall 265 and movable with the force sensor. Probe 274 is arranged during its movements with the force sensor to interrupt the light emitted by light emitter 270 in response to movements imparted to the force sensor by the velocity head 303. The neon light element 270 is mounted in the lower portion 275 of the block and more particularly, at the juncture of a horizontal bore 276 and a vertical bore 277 in this block portion 275. Bore 277 is aligned with yet another bore 278 in the upper block portion 279 and the photocell 271 for detecting the emitted light is mounted in this bore 278.

The force sensor 251 is shown in FIG. 20 in a null position 286 it assumes in the absence of airflow through the housing 235 and under the temperature conditions than being sensed by temperature sensor 237. Under such circumstances, if the temperature rises, the coil spring 237 responds to the temperature change and pivotally urges the force sensor 251 in an upstream direction, as for example, to the position depicted at 281 in FIG. 20. Thereafter, as the temperature falls, the response of the spring 237 is such as to diminish the upstream directed biasing force and the sensor accordingly is pivotally drawn in a downstream direction toward its null position. The biasing force response of spring 237 to temperature changes transpires automatically with or without airflow through the housing and as such, the upstream directed biasing force exerted by the spring 237 increases and decreases in response to rising and falling temperature changes so that the movements of the force sensor are influenced by both temperature changes and velocity head changes.

When the forced air cooling system is operational, there is a flow of air through housing 227, a portion of the airflow delivered by the fan 231 passes through the housing component 235 of the speed regulating device 234. Under such circumstances, the fluid flow forces 303 imparted to the front wall 282 of sensor 251 pivotally urge the sensor in a downstream direction, against the upstream directed biasing force 246 of spring 237, as for example, to the downstream position depicted at 283. This downstream pivotal movement of the force sensor 251 carries the probe 274 further into the slot 273 so that it interrupts the quantum of light falling on the photocell 271 and varies the circuit resistance in accord with the amount of light that is interrupted.

The power regulating circuit 238 and its relationship to the fan motor power source and position detecting elements is best seen in FIG. 24. As seen therein, the fan motor 233 is connected in series with an A-C power source 284 and a triac 285 that is connected across line voltage provided by lead line 286 and 287. Line 287 has a control switch 288 that, of course, is closed to render the circuits operational.

Also connected across line voltage is an R-C circuit 289 that comprises a variable resistor 290 and a capacitor 291 that are connected in series between line taps 292 and 293. The photocell 271 is connected in parallel with the variable resistor 299 as to a tap 294 in line 286 and a tap 295 in the R-C circuit 289. The output lead 296 of circuit 289 is connected through a current limiting resistor 302 to a diac 297 which, at line tap 298, is connected to the gate lead 299 of the triac 285. A by-pass capacitor 300 for controlling spurious pulses is connected between tap 298 and tap 301 in line 287. The neon light 270 is connected between a line tap 305 in line 286 and a line tap 306 in line 287. A current limiting resistor 307 is provided between the tap 305 and 306 in the neon light circuit.

Operationally, the R-C circuit 289 providaes a voltage to the diac 297 that lags the line voltage so that when the breakover voltage for the diac is reached during each half-wave cycle, the triac 285 is gated and rendered conductive between the line voltage leads 286 and 287 for the balance of the half-wave cycle. The parallel arrangement of resistor 290 and photocell 271 provide a variable resistance in the R-C circuit and which automatically varies in response to the movements of the force sensor 251 to govern the diac firing and hence, the triac conductance in point of time reference to the line voltage wave form. Thus, when the force sensor 251 is at its null position 280, the full quantum of emitted light is detected by the photocell 271. This provides a low resistance by-pass to the variable resistor in the R-C circuit so that the voltage phase shift in the output line 296 is relatively short in point of time reference to the line voltage wave form. As such, the breakover voltage for the diac 297 is reached early in each half-wave of the line voltage, and the triac 285 is rendered conductive for a large portion of the half-wave cycle and a maximum of power is delivered to the motor 233 under the setting of the variable resistor 290. On the other hand, as the probe or light interrupting element 274 of sensor 251 progressively moves into the slot 273 and progressively interrupts a greater quantity of light emitted by the light source 270, the resistance of the photocell 271 progressively increases. This increasing resistance with downstream movement of the sensor probe progressively increases the time lage of the R-C circuit output 296, and hence, progressively delays the firing of the diac 297 and the resulting conductance of the traic 285 in point of time reference to the line voltage. As such, the power delivered to the motor progressively diminishes as the photocell 271 resistance increases in response to downstream movement of the sensor 251. This diminishing power supply results in a reduction in motor speed and hence, a reduction in the velocity head and flow forces imparted to the sensor 251. As such, and as the velocity head diminish, spring 237 urges the sensor 251 in an upstream direction from its deflected position. Such movement in the upstream direction progressively increases the light detectable by the photocell 271 and again diminishes the resistance in the R-C circuit. This diminishing resistance again advances the firing time of the diac 297 in point of time reference to line voltage so that the triac is again rendered conductive during a greater portion of each half-cycle of the line voltage and results in the delivery of more power to the motor and a greater speed.

During normal operation of the system, the force sensor 251 attains a position at which the velocity head forces 303 imparted to the sensor 251 balance the biasing forces 264 of spring 237 so that the force sensor assumes a stable position and the delivered power and speed of the motor remain constant so long as the temperature conditions remain unchanged. On the other hand, when a temperature rise is detected, the spring 237 responds to increase the biasing force on the sensor 251 so that an upstream movement of the force sensor results. This diminishes the resistance in the R-C circuit by-pass so that the diac 297 advances its firing time during each half-cycle of the line voltage and the triac 285 is, accordingly, rendered conductive for a greater time period during each half-cycle. This results in a greater power delivery to the motor with an acceleration and subsequent deceleration until a stable position is again reached by the force sensor. The converse, of course, applies when the spring response is to falling temperature conditions.

Reference is now made to FIGS. 25 and 26 and which schematically illustrate another forced forced air cooling system 310 that embodies certain aspects of the invention. Here, the speed regulating device 311 has a housing 312 for a monitoring device 313 that is used in sensing and detecting changes in the velocity head 314 of the fluid delivered by the fan 15. Also housed in housing 312 is a spring type device 316 for sensing and detecting temperature changes and a power regulating circuit 317 that is diagramatically illustrated in FIG. 26. The front and rear walls 318 and 319 of the housing 312 have rectangular inlet and outlet port forming apertures 320 and 321 so as to accommodate the flow of a portion of the fan delivered air through the housing. The device 313 monitoring the velocity head of the airflow includes a velocity head force sensing component 322 for sensing and detecting the velocity head 314 of the air stream. Component 322 is mounted in the flow path 323 for the air delivered through the housing by the fan. The monitoring device 313 also includes a switching component 324 for detecting the positions assumed by the force sensor 322 as it is pivotally deflected under the influence of the forces that are imparted to it by the airflow.

The temperature sensor 316, in this instance, is also arranged to influence the movements of the force sensor in response to temperature changes, and the power regulating circuit 317 is controlled in response to the make and break action of the switch 324 so as to regulate the power delivered to the fan motor 325 in accord with the sensed velocity head and temperature changes.

The airflow force sensor 322 illustrated is similar to that contemplated in the prior embodiment, and is in the form of a rectangular element that is pivotally suspended in the flow path 323 from a horizontal rod or shaft 326 that is suitably mounted in the housing and arranged transversely of the airflow path 323. Like the previous embodiment, rod 326 is frictionally maintained in position, but is rotatably adjustable as by means of a lever 327 so as to enable manual adjustment of the spring biasing force 328 in calibrating the device 311.

The temperature sensor 316 is again shown in the form of a coiled bimetallic hair spring element that is coiled about the rod 326 with the convolutions 329 passing through a cutout (not shown) at the upper end of the force sensor 322, and in an arrangement where the inner end 330 of the spring type sensor 316 is fixed to the rod 326, while the outer end 331 is fixed to the back or downstream side wall 332 of the force sensor 322. In this instance, the outer surface 333 forming component of the bimetallic element has a higher temperature coefficient of expansion than the inner surface 334 forming component so that, in response to rising temperature conditions, the upstream directed biasing force 328 exerted on the force sensor 322 increase whereas the biasing force 328 conditions.

The position detecting switch component 324 of the monitoring device 313 is arranged to detect the movements of the force sensor into and out of its null position 335. The switch component 324 comprises a contact 336 that is carried on the front or upstream surface 337 of the force sensor 332. Contact 336 is electrically connected to the power regulating circuit 317 through the metal sensor and shaft and by lead line 338. The other contact 339 of switch 324 is mounted on a nonconductive block 340 that is fixed to the housing in front of the force sensor 322 and the contact 339 is connected by a lead line 341 to the power regulating circuit 317, as will be subsequently seen.

Operationally, when the fan 315 is energized, there is a flow of air through the housing 312 and, as long as the velocity head forces 314 imparted to the sensor 322 do not exceed the biasing force 328 of the temperature responsive spring component 316, the force sensor 322 remains in its null position 335. On the other hand, when the velocity head applied to the sensor 322 exceeds the upstream biasing force 331 of the spring, the sensor 322 is pivotally deflected from its null position 335 as to the downstream position depicted at 342. As this happens, the switch contacts 336 and 339 part and open the switch circuit. As will be subsequently seen, this results in a diminished power delivery to the fan motor which, in turn, results in an upstream deflection of the force sensor 322 under the influence of the biasing force applied by the spring 316 so that the force sensor is thereafter again returned to its null position.

The fan motor 325 and A-C power source 343 are connected in series with a control switch 347 and a triac component 344 of the power regulating circuit. The triac component 344 is connected across line voltage and which is provided by lead line 345 and 346. In parallel with the triac 344 is an R-C circuit 348 that comprises a variable resistor 349 and a capacitor 350, these circuit components 349 and 350 being connected in series between line taps 350 and 351 in lines 345 and 346 respectively. The output lead 352 of the R-C circuit 348 is connected to a diac 353 which in turn, is connected to a tap 354 to the gate lead 355 for the triac 344, as seen in FIG. 26. A capacitor 356 is connected between this tap 354 and a tap 357 in line voltage lead 346 for controlling spurious pulses. The switching component 324 is connected in parallel with the variable resistor 349, with leads 338 and 341 being connected to line taps 350 and 358 in line voltage lead 345 and R-C circuit output lead 352, respectively.

The R-C circuit 348 again serves in the regulating circuit 317 to provide a lagging voltage in the output lead 352. When the switch 324 is open the breakover voltage of the diac 353 is reached at a point in time that provides a maximum time lag in reference to the line voltage wave form. This time lag is determined primarily by the setting of variable resistor 349. As such, the triac 344 is rendered conductive at a point in time reference to line voltage which provides for a minimum power delivery to the motor during each half-wave cycle of the line voltage. On the other hand, when the contacts 336 and 339 are closed, resistor 349 is short circuited so that the breakover voltage of the diac 347 is then reached at a point in time reference to the line voltage wave form that is in advance of that provided when the switch is open. As such, the triac 344 is rendered conductive at an earlier point in time reference to the line voltage wave form so that power is delivered to the motor for a longer period each half-wave cycle. The switching action of the switch 324 accordingly, serves to control the circuit 317 so that the power delivered to the motor fluctuates between high and low levels that are determined by the closed and opened circuit conditions established for the switch 324 by the movements of the sensor 322.

Operationally, when control switch 347 is closed, the force sensor 322 is in its null position 335 and the switch contacts 336 and 339 are in closed cirucit positions seen in FIG. 25. As such, the variable resistor is by-passed and is delivered to the motor and delivers a stream of fluid along the flow path 323. As the velocity head forces 314 on the sensor 322 increase, the biasing force 328 of the spring 316 at the null position for the force sensor is exceeded, and the force sensor is pivotally deflected in the downstream direction as to the deflected position designated at 342. During this pivotal movement, the switch contacts 336 and 339 part so that the switch circuit opens. This break in the switch circuit paralleling resistor 349 immediately causes an increase in the voltage time lag in the output lead 352 and results in an attainment of the breakover voltage for the diac 353 at a point in time reference to the line voltage wave form which is subsequent to that attained when the switch contacts were closed. As such, the triac 344 is then rendered conductive for a shorter period during each half-wave cycle of the line wave voltage, and the power delivered to the motor accordingly falls to the lower level determined by the R-C circuit component.

In normal operation under a stable temperature condition, the motor 325 will attain a speed level of operation at which it cyclically accelerates and decelerates within a narrow speed range and in accord with the force sensor response to the velocity head developed by the impeller 359. The sensor movements into and out of the null position 335, of course, cyclically close and open the switch circuit and result in the successive delivery of high and low power levels to the motor for maintaining its operating speed range.

Under circumstances where there is a sensed rising temperature change, the biasing force of the spring 316 on the force sensor 322 automatically increases. As such, the velocity head forces needed to open to switch 324 also increase so that the fan speed under such circumstances is then caused to operate at a higher speed level so that there is a greater flow of air for cooling purposes. Conversely, as a diminishing temperature change is detected, the biasing force on the force sensor diminishes and thus permits the switch to open at a lower velocity head so that the motor is thereafter controlled to operate at a lower speed level.

Figure 27:
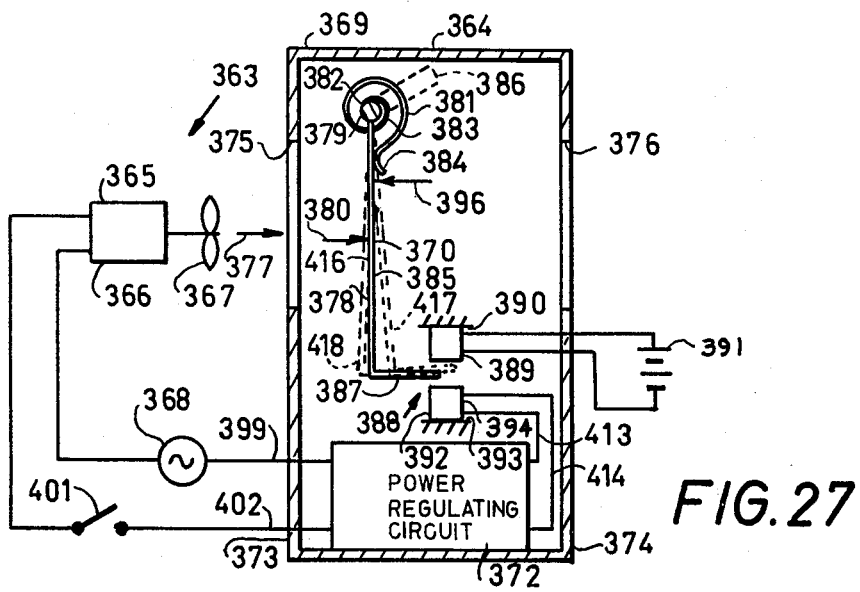
FIG. 27 schematically illustrates yet another embodiment of the invention.
Figure 28:
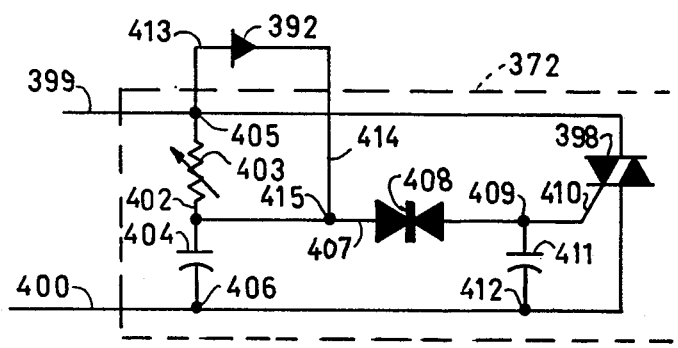
FIG. 28 is a circuit diagram illustrating the power regulating circuit utilized in the embodiment illustrated in FIG. 27 and in relation to certain components shown therein.

FIGS. 27 and 28 illustrate yet another embodiment of the invention, and wherein an electronic switching device is used to control the power regulating circuit to deliver power to the motor at high and low levels in accord with the movements of the velocity head force sensor. In FIG. 27, the forced air cooling system 363 is seen schematically as including a motor speed regulating device 364 and a fan 365 that has an electric motor 366 which is drivingly connected to an impeller 367 and electrically connected to an A-C power source 368.

The speed regulating device 364, in this instance, also includes a housing 369 for a monitoring device 370 that is used to sense and detect the velocity head changes in the air stream delivered by the fan. The housing contains a spring type device 381 for sensing and detecting temperature changes and a power regulating circuit 372 for controlling the power delivered to the motor in accord with the response of the monotor to velocity head and temperature changes.

The housing 369 has rectangular apertures in the front and rear walls 373 and 374 and which form inlet and outlet ports 375 and 376 that accomodate the flow of a portion of the fan delivered air along a flow path 377 through the housing.

The monitoring device 370 has a vane type force sensor 378 which is generally rectangular in configuration and pivotally suspended from a rod or shaft 379 that is arranged transversely of the flow path 377. The sensor 378 is pivotally deflectable about the axis of the shaft 379 in response to velocity head forces 380 imparted to the sensor. The upper end of the rectangular component 378 has a cutout (not shown) to accommodate the mounting of the spring type bimetallic temperature sensor 381. Sensor 381 is again shown in the form of a coiled bimetallic hair spring type member that is fixed at its inner end 382 to the shaft 379 and in an arrangement where the convolutions 383 extend through the cutout area to a point at which the outer end 384 of the spring is fixed to the back or downstream wall 385 of the force sensor 378. Shaft 379 is supported by the housing structure and is rotatably adjustable through the manipulation of a lever 386 that enables adjustment of the biasing force as in previous embodiment described herein.

The temperature sensing spring component is similar in structure to those previously considered, and in response to rising temperature conditions exerts an increasing upstream directed biasing force 396 on the force sensor. The lower end of the force sensor 384 is bent to provide a downstream projecting extension which serves as a light interrupting probe 387 that facilitates the detection of the sensor movements and positions assumed thereby.

The position dectecting component 388 of the monitoring device 370 includes a light emitting element 389 that is fixed to a suitable support 390 in the housing 369 and connected to a suitable D-C power souce such as battery 391. It also includes a light detecting element 392 which is arranged to detect light emitted by the light emitter 389 and fixed to a suitable support 393 within the housing. The light detector 392 is vertically spaced apart from the light source so as to accomodate movements of the probe 387 in the space 394 therebetween.

The power regulating circuit 372 comprises a triac 398 which is connected across line voltage provided by lines 399 and 400, and again in series with the control switch 401, an A-C power source 368 and the electric fan motor 366. The power regulating circuit has an R-C circuit 402 that includes a variable resistor 403 and capacitor 404 which are connected in series and at their opposite ends to line taps 405 and 406 as seen in FIG. 28. The output lead 407 of the R-C circuit 402 connects with a diac 408 that is connected through line tap 409 to the gate circuit lead 410 of the triac 398, A capacitor 411 being connected between line tap 409 and line tap 412 in line voltage lead 400, to control spurious pulse illustrated in FIG. 28.

The light detecting element 492 in this instance, is a phototransistor which functions as an electronic switching element that is connected in parallel with the variable resistor 403 as by lead 413 to line tap 405 and lead 414 to a line tap 415 in the R-C circuit output 407. Operationally, the phototransistor 392 has a threshold light level above which is is rendered conductive and below which it is rendered nonconductive. As such, when the force sensor 378 is in its null position 416, the phototransistor received light in excess of the threshold value and is hence, rendered conductive so that resistor 403 is by-passed. When the probe interrupts the light as the downstream sensor position 417, the light sensed by the phototransistor is below the threshold level so that the phototransistor is then rendered nonconductive and the setting of the variable resistor 403 controls the R-C circuit output.

The R-C circuit 402 again functions to provide a lagging voltage in the output line 407 and which provides a breakover voltage to the diac 408 which, in point of time, lags the line voltage wave form so that when the diac 408 fires and energizes the gate circuit 410, the triac 398 is rendered conductive for the balance of the half-wave cycle of the line voltage. By virtue of the parallel arrangement of the phototransistor 392 and the variable resistor 403, the conductive or nonconductive condition of the phototransistor 403 controls the point in time reference to the line voltage wave form at which the diac 408 fires, and hence, the power delivery to the electric motor 366 through the triac 398. Thus, when the phototransistor 392 is rendered conductive, variable resistor 403 is shorted out so that the time lag in the firing of the diac 408 in reference to the line voltage wave form is minimal and power is delivered to the electric motor throughout a large portion of the half-wave cycles. Conversely, when the phototransistor 392 is rendered nonconductive, the lag in point of time reference to the line voltage wave form at which the breakover voltage is reached by a diac is greater so that the power delivery to the motor is for a shorter interval each half-wave cycle.

The velocity head force sensor 378 is shown at its null position 416 in FIG. 27, and under the temperature conditions being sensed by the temperature responsive spring 381. Assuming that control switch 401 is open and a temperture rise transpires and is detected by the temperature sensor 381, the upstream directed biasing force 396 exerted on the force sensor 378 by the spring 381 will increase. This force will accordingly, automatically move force sensor 378 in an upstream direction to assume another null position 418, which is then consistent with the sensed temperature condition. This variance in the biasing force 396 also transpires when the control circuit is rendered operative by the closure of switch 401 so that the biasing force exerted by the spring increases and decreases in response to the rising and falling temperature changes in the fan delivered air.

Operationally, when the switch 401 is closed with the sensor in the null position designated at 378, the light emitted by element 389 is detected by the phototransistor 392. Under such circumstances, the light detected exceeds the threshold level of the phototransistor so that the variable resistor 403 is by-passed and the R-C circuit output lead 407 has a minimum voltage lag in reference to the line voltage wave form. As such, the breakover voltage for the diac 408 is reached at an early point in time lag reference to the line voltage wave form and triac 398 is rendered conductive throughout a large portion of each half wave cycle. A maximum level is accordingly delivered to the electric motor 366 during each half-wave cycle so that the impeller 367 accelerates to a point of providing a velocity head with a force 380 that exceeds the biasing force 396 of spring 381. This causes the force sensor 381 to be pivotally deflected in a downstream direction, as for example, to the position designated at 417. This responsive downstream movement of the sensor 378 to the velocity head forces causes the probe 387 to interrupt the light emitted from element 389 so that the light detected by the phototransistor 392 falls below its threshold value and the voltage lag in the R-C circuit output line increases. As such, the breakover voltage for the diac 408 is thereafter reached at a point in time reference to the line voltage wave form that is subsequent to that when the phototransistor 392 was conductive. The triac 398 is accordingly rendered conductive for a shorter period of time during each half wave cycle and this results in a generally lower level of power applicaton or delivery to the motor. This lower level to power application reduces the torque on the impeller 367 so that the motor speed and velocity head diminish to a point at which the biasing force of the spring 381 exceeds the velocity head 380 and urges the force sensor out of its light interrupting position and back toward its null position 378. At 378, the light detected by the phototransistor 392 reaches the threshold level and the phototransistor 392 is again rendered conductive so that a maximum power level is again delivered to the motor. These precessing movements of the force sensor 378 continue until the velocity head force 380 and biasing force are substantially balanced. At this point, the position of the sensor 378 is such that slight upstream movement of the sensor permits the threshold level of light to be detected while slight downstream movement diminishes the light detection to below the threshold level. As such, the power regulating circuit 372 is controlled by the movements of the force sensor 378 to successively deliver high and low power energy levels to the motor and which result in a cyclic acceleration and deceleration of the motor in a narrow speed range that is determined by the spring biasing force 396.

If the temperature rises, the biasing force 396 exerted by the spring increases, and this, of course, requires a higher velocity head force 380 in order to balance the biasing force so that the power regulating circuit is then controlled by the transistor response to provide an overall higher power energy level to the motor in comparison to that delivered at the lower temperature conditions. The converse is, of course, also true when the spring component response is to a detected temperature decrease.

Figure 29:
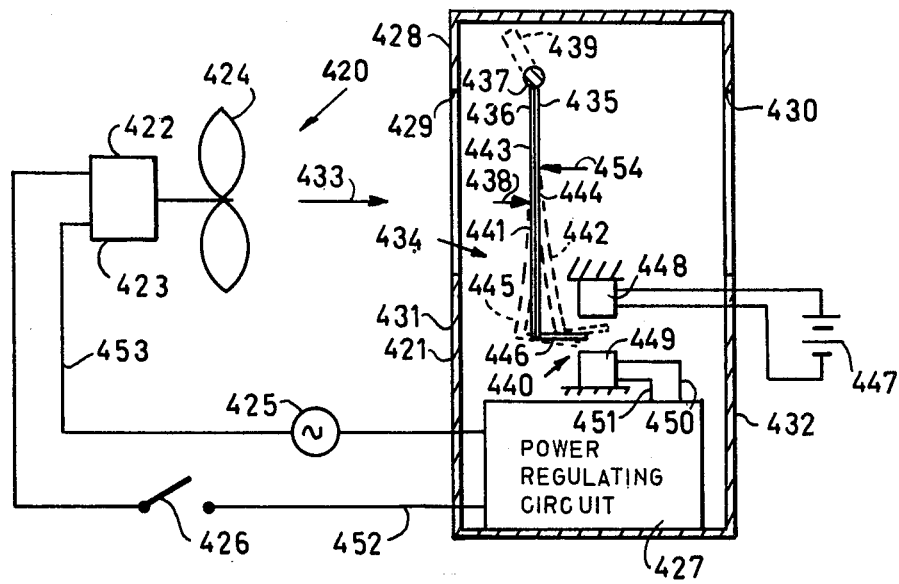
FIG. 29 schematically illustrates yet another embodiment of the invention.

Reference is now made to FIG. 29 and the schematic illustration of yet another embodiment of the invention and wherein the force sensor and temperature sensor have common structure which includes a bimetallic component that is resiliently deflectable in response to velocity head forces and also bends in response to temperature changes. In this instances, the forced air system 420 includes a motor speed regulating device 421 and a fan 422 having an electric motor 423 which is drivingly connected to an impeller 424. The motor is electrically connected to an A-C power source 425 through a control switch 426 which energizes a power regulating circuit 427 upon being closed.

The speed regulating device 421 is shown schematically and includes a housing 428 that has an inlet port 429 and an outlet port 430 in the front and rear walls 431 and 432 respectively to again accomodate the flow of a portion of the fan delivered air along the flow path 433 through the housing.

The speed regulating device 421 includes a velocity head force monitoring device 434 for sensing and detecting velocity head force changes and a device 435 for sensing and detecting temperature changes. In this embodiment, the monitoring device 434 comprises a generally rectangular force sensor component 436 which, at its upper end, is fixed to a rod or shaft 437 that is arranged transversely of the flow path 433. Through manipulation of the lever 439, the rod 437 may be rotated to pivotally adjust the position of the force sensor in relation to the position detecting component 440 of the monitor. This rectangular component is a bimetallic laminated component which has a metal laminate 443 at its upstream side with a lower temperature coefficient of expansion than the metal laminate 444 at its downstream side. As such, when the temperature rises, the component 436 bends in an upstream direction, as for example, from the null position 441 illustrated for the existing temperature condition, to an upstream position such as designated at 445. Conversely, as the temperature condition falls, the bending movement is downstream. Apart from bending under changing temperatures, the bimetallic force sensing component 436 is made from resilient materials so that it bends in a downstream direction under the influence of velocity head forces 438, as for example from the null position 441 to the downstream position designated at 442. As seen in the drawing, the lower end of the force sensor 436 is bent in a downstream direction to provide a probe for the interruption of light from the light emitting element of the position sensing component 440.

The position detecting component 440 of the monitoring device 434 comprises a battery 447 powered light emitting element 448 and a photocell 449 that are vertically spaced apart and fixed in the housing to accomodate movement of the probe therebetween. The power regulating circuit 427 is adapted to vary the power delivered to the motor 423 in accord with the quantum of light detected by the photocell 449. The photocell is connected to the power regulating circuit 427 by leads 450 and 451 and the circuit 427 is connected to the motor through switch 426 by lead 452 and through the power source 425 by lead 453.

When the control switch 426 is initially closed and the force sensor 436 is initally in the null position 441, maximum power is delivered to the electric motor and as the velocity head forces 438 increase with increasing acceleration of the impeller 424, force sensor 436 is deflected downstream to, for example, the position designated at 442. During such downstream movement, progressively more light is interrupted by the probe and the power delivered to the motor progressively diminishes. As such, the torque applied to the impeller progressively diminishes with resulting diminishment in the velocity head forces 438. The resilient nature of the sensor materials of construction accordingly cause the sensor 436 to move back toward the null position 441 under the biasing forces 454 attributed to the resilient nature of the materials. As this movement transpires, the photocell is progressively exposed to a greater amount of emitted light and progressively more power is delivered to the motor. Thereafter, there is precessing movement of the sensor upstream and downstream, as the velocity head force lags the changes in speed of the impeller and until the impeller speed is sufficient to provide a constant velocity head force 438 which equals the upstream biasing force 454 exerted by the resilient materials of the sensor. Thereafter, the speed remains constant until the temperature change transpires.

If the temperature rises, the sensor 435 bends upstream from its orginal downstream operating position so that the probe progressively moves upstream with the temperature rise. This results in a greater power delivery to the motor and a greater velocity head that again delfects the sensor 435 downstream to compensate for the temperature rise and until the biasing force and generated velocity head are again balanced. The converse, of course, transpires with falling temperature conditions evidencing a decreasing cooling demand.

Figure 30:
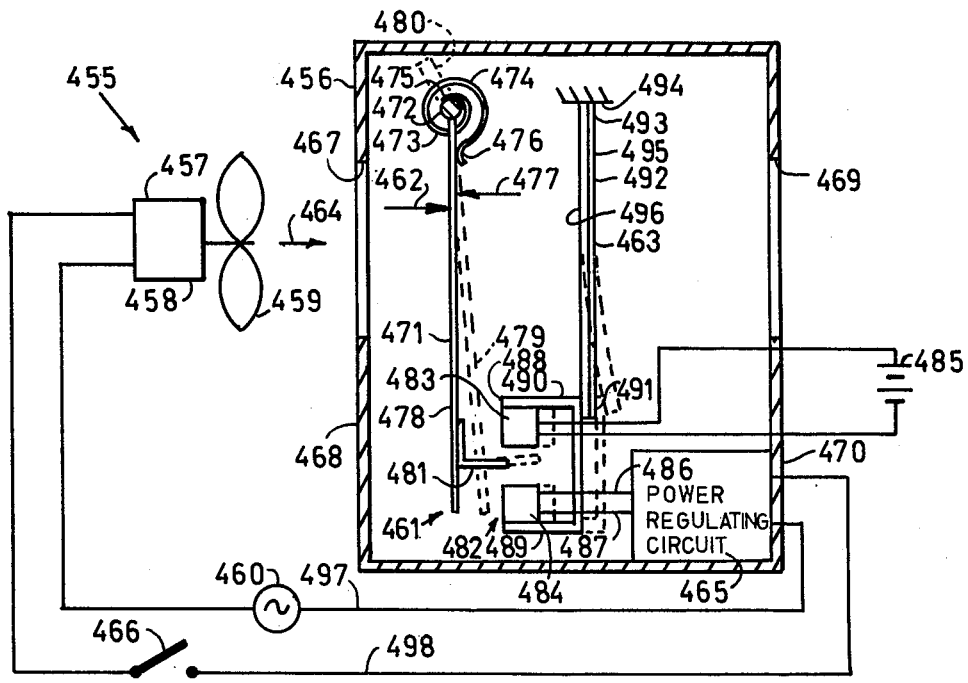
FIG. 30 schematically illustrates yet a further embodiment of the invention.

FIG. 30 schematically illustrates yet another embodiment of the invention and wherein the response of the temperature sensor to rising and falling temperature changes is used to appropriately shift the position of the force sensor position detecting device in relation to the force sensing component of the monitoring system so as to modify the response of the monitoring system to include a temperature change factor.

The forced air cooling system 455 in this instance, comprises a motor speed regulating device 456 and an electrically powered fan 457 which has an electric motor 458 that is drivingly connected to the fan impeller 459 and electrically connected to an A-C power source 460. The motor speed regulating device 456 comprises a housing for housing the monitoring device 461 used in sensing and detecting the velocity head forces 462, a device 492 for sensing and detecting the temperature changes in the fan delivered air that flows along the flow path 464 through the housing, and a power regulating circuit 465 which is connected to the power source and fan motor through a control switch 466. The housing has an inlet port 467 in its front wall 468 and an outlet port 469 in the back wall 470 to again accomodate the flow of air along the flow path 464.

The monitoring device 461 in this instance, comprises a vane type rectangular force sensor that is pivotally suspended at its upper end from a transversely arranged rod 472. The force sensor has an upper end cutout (not shown) to accomodate the convolutions 473 of a hair spring 474 that is fixed at its inner end 475 to the rod and at its outer end 476 to the force sensor 471. Spring 474 exerts a biasing force 477 that is resistive of pivotal movement of the force sensor 471 in a downstream direction and tends to retain the sensor in its null position 478 while resisting downstream deflection of the sensor as to position 479. Rod 472 is supported crosswise of the flow path 464 and is rotatably adjustable by manipulation of a lever 486 so as to adjust the upstream directed biasing force 477 exerted on the force sensor 471. As its rear or downstream side, force sensor 471 is equipped with an angle member that projects rearwardly and serves as a light interrupting probe 481 during the operation of the monitoring device.

The position detecting component 482 of the monitoring device 461 includes a light emitting element 483 and a light detecting element 484 that are vertially spaced apart to accomodate movements of the probe in the space therebetween. The light emitter 483 is connected to a D-C power source 485 in the instant illustration. The light detector 484 is an electronic switching element in the form of a phototransistor that is rendered conductive when detecting light above a threshold value and is rendered nonconductive when detecting light below its threshold level, the phototransistor being connected by leads 486 and 487 arranged to control the power regulating circuit 465. The power regulating circuit may be of the kind depicted in FIG. 28 and designed to deliver a high power level to the motor when the phototransistor is rendered conductive and to deliver a lower power level when the phototransistor is rendered nonconductive.

The light emitting and detecting elements 483 and 484 in this embodiment are secured to forwardly projecting arms 488 and 489 of a rigid U-shaped bracket 490 that is secured to and suspended from the bottom end 491 of a narrow bimetallic temperature sensing component 492. The temperature sensor 492 is fixed at its upper end 493 to a rigid support 494 in the housing. The temperature sensor 492 has a narrow laminate 495 at its downstream side that is made from metal having a lower temperature coefficient of expansion than that of the narrow laminate 496 at its upstream side so that as the temperature rises in the housing, the component bends in a downstream direction and carries the assembly comprising the bracket and supported elements of the detector downstream relative to the force sensor 471. Conversely, as the temperature falls within the housing, the assembly is moved upstream and relatively closer to the force sensor 471. Accordingly, the response of the temperature sensor is such as to relatively move the position detector 482 and force sensor 471 closer together under falling temperature conditions and to relatively move the position detector and force sensor apart during rising temperature changes.

The power regulating circuit 465 is connected to the motor 458 of fan 457 through the A-C power source 460 by lead 497 and through the control switch 466 by lead 498. When switch 466 is closed, the power regulating circuit 465 and motor 458 are energized. At the null position 478, illustated for the force sensor, the probe arrangement is such that the phototransistor 484 detects a full quantum of light from source 483. As such, closure of switch 466 results in the delivery of a high power level to the motor. As the motor then accelerates, the impeller movement causes an increase in the velocity head forces 462 imparted to the force sensor 471. As this transpires, the force sensor 471 is deflected downstream against the biasing forces 477 of spring 474, and until the sensor 471 assumes a downstream positon, such as depicted at 479, and at which the forces 462 and 477 become equal. This downstream movement of the force sensor 471 however, causes an interruption of the light from source 483 so that the light detected by the phototransistor 484 falls below the threshold value and the circuit 465 is controlled by the response to deliver the power to the motor at a lower energy level. This results in a motor speed diminishment under the fluid friction encountered by the impeller and the velocity head forces 462 diminish below that of the biasing force 477 so that spring 474 then commenses to urge the sensor 471 back toward its null position 478. As this transpires, the phototransistor 484 is progressively exposed to more light from source 483, and as the threshold level is exceeded, the circuit 465 is again controlled to provide the higher power level to motor 458. This processing movement of the force sensor 471 continues and the circuit 465 successively delivers high and low power energy levels to the motor in accord with the sensor response to the velocity head, and the motor is caused to accelerate and decelerate in a narrow range of speed at which the probe by slight upstreamand downstream movement causes successive conductance and nonconductance of the phototransistor.

The above description has contemplated a stabile temperature condition within the housing, and at which the temperature sensor and suspended assembly have retained the solid line positions designated at 499. If a temperature increase is detected by the bimetallic componenet 492, thus evidencing an increasing cooling demand, the component 492 bends in a downstream direction so that the suspended assembly moves downstream as for example, from position detector 482 further away from the force sensor 471 so that a greater velocity head force 462 is required to move the sensor to a position at which the phototransistor is rendered nonconductive. As such, the fan motor is controlled to operated at a higher speed,range level until such time as the increased cooling demand is satisfied and the temperature again returns to normal and causes a return of the position detector supporting assembly to its null position 499.

While only certain preferred emobidments of this invention have been shown and described by way of illustration, many modifications will occur to those skilled in the art and it is, therefore, desired that it be understood that it is intended herein to cover all such modifications that fall within the true spirit and scope of this invention.

I claim:

1. A fluid flow regulating system comprising an electrically powered motor, a fluid impeller which is drivingly connected to and driven by the motor, said motor having a continuously energized operating speed, and a system for controlling the speed of the motor to regulate the flow of fluid delivered by the impeller, said controlling system comprising an electric circuit connected to and for energizing the motor, said circuit having switching means for opening and closing the circuit to deenergize and energize the motor, a dynamic force sensing member which is movably mounted in the path for a stream of fluid delivered by the impeller to detect dynamic fluid flow forces applied to the member by fluid flowing into contact therewith, said switching means being automatically responsive to a movement of the member which reflects an applied dynamic fluid flow force in excess of a predetermined force level to open the circuit and deenergize the motor and to another movement of the member which reflects an applied dynamic fluid flow force less than said predetermined force level to close the circuit and energize the motor, said motor being acceleratable to a speed productive of an applied dynamic fluid flow force having said predetermined force level and being productive of an applied fluid flow force in excess of said predetermined force level at said continuously energized operating speed, whereby the motor is controlled to cyclically accelerate and decelerate in a speed range below said continuously energized operating speed and the impeller continuously delivers the fluid at a flow rate regulated in accord with the controlled speed of the motor.

2. A fluid flow regulating system in accord with claim 1, wherein the sensing member is mounted for reactive movement out of a position therefore in response to an applied dynamic fluid flow force in excess of said predetermined force level, wherein the motor speed controlling system further comprises means biasing the member against such reactive movement and being yieldable to an applied dynamic fluid flow force in excess of said predetermined force level, thereby to permit such reactive movement, said biasing means being adapted ot movably return the member to said position following such reactive movement and in response to a detected applied dynamic fluid flow force below said predetermined force level, and wherein the switching means is automatically responsive to such reactive movement and such return movement to respectively open and close said circuit.

3. A fluid flow regulating system in accord with claim 2, wherein said biasing means exerts a biasing force which is resistive of such reactive movement and has said predetermined force level at said position, and wherein said biasing means is adjustable to vary siad predetermined force level.

4. A fluid flow regulating system in accord with claim 1, wherein the member is an airfoil that has a cambered surface.

5. A fluid flow regulating system in accord with claim 2, wherein said switching means comprises a pair of electrical contacts which are engaged at said position for the member, one of said contacts being mounted on and movable with said member relative to the other of said contacts and being disengaged from the other of the contacts by such reactive movement.

6. A fluid flow regulating system in accord in claim 1, wherein the switching means is electronic switching means that is responsive to detected light from a source thereof, and wherein the member has means movable with the member to interrupt the light from said source and therby control said electronic switching means in response to movements of the member.

7. A fluid flow regulating system in accord with claim 1, which further comprises means movable to diminish the flow of the fluid into contact with said member, thereby to diminish the applied dyanmic fluid flow forces detected by the member in said speed range, whereby said motor is therafter controlled to cyclically accelerate and decelerate in a range of speed thereabove.

8. In a forced air cooling system having a fan arranged to deliver a stream of air into an area to be cooled thereby and having an electrically powered motor with a continuously energized operating speed productive of a flow of air exceeding the normal cooling requirement for the area, a system for controlling the motor speed to regulate the rate of airflow to the area comprising an electric circuit connected to and for energizing the motor, said circuit having switching means for opening and closing the circuit to deenergize and energize the motor, a dynamic force sensing member which is arranged for contact with the flowing air of an air stream delivered by the fan to detect the dynamic airflow forces applied to the member by such contact, said member being reactively movable from one position to another position in response to an applied dynamic airflow force that exceeds a predetermined force level, means biasing the member against such reactive movement with a biasing force that determines said force level and being yieldable to an applied dynamic airflow force in excess of such biasing force, thereby to permit such reactive movement, said biasing means being adapted to movably return the member to its one position as the applied dynamic airflow force following such reactive movement diminishes to below said predetermined force level, said switching means being operative under the control of the sensing member to maintain a closed circuit energized motor condition when the member is at its one position and to maintain an open circuit deenergized motor condition when the member is at its other position, said motor being acceleratable to a speed productive of an applied dyanamic airflow force having said predetermined force level and being productive of an applied dynamic airflow force in excess of said biasing force at said continuously energized operating speed, whereby the motor is controlled to cyclically accelerate and decelerate in a speed range below said continuously energized operating speed and to continuously deliver a stream of air to the area at a flow regulated in accord with the controlled speed of the motor.

9. In a forced air cooling system having a fan arranged to deliver a stream of air into an area to be cooled thereby and having an electrically powered motor with a continuously energized operating speed productive of a flow of air exceeding the normal cooling requirement for the area, the system for controlling the motor speed in accord with claim 8, further comrising means for diminsihing the flow of the air into contact with said member in response to a sensed increasing temperature condition in the stream of air delivered into the area.

10. In a forced air cooling system having a fan arranged to deliver a stream of air into an area to be cooled thereby and having an electrically powered motor with a continuously energized operating speed productive of a flow of air exceeding the normal cooling requirement for the area, the system for controlling the motor speed in accord with Claim 9 wherein the airflow diminishing means comprises means housing the sensing member and forming a passageway for the passage of the flowing air contacted by the member, means for sensing the temperature condition in the stream of air delivered into the area and means operating under the control of the temperature sensing means and being movable to restrict the flow of air through the passageway in accord with a sensed temperature rise above a predetermined temperature condition.

11. In a forced air cooling system having a fan arranged to deliver a stream of air into an area to be cooled thereby and having an electrically powered motor with a continuously energized operating speed productive of a flow of air exceeding the normal cooling requirement for the area, the system in accord with Claim 10, wherein the force sensing member comprises an airfoil with a cambered surface.

12. In a forced air cooling system having a fan arranged to deliver a stream of air into an area to be cooled thereby and having an electrically powered motor with a continuously energized operating speed productive of a flow of air exceeding the normal cooling requirement for the area, the system in accord with Claim 11 further comprising light emitting means, means for detecting light from the emitting means and controlling the operation of the switching means, said force sensing member being arranged during its movements to interrupt the light detectable by the emitting means and thereby control said switching means.

13. In a force air cooling system having a fan arranged to deliver a stream of air into an area to be cooled thereby and having an electrically powered motor with a continuously energized operating speed productive of a flow of air exceeding the normal cooling requirement for the area, the system for controlling the motor speed in accord with Claim 8, wherein the biasing means is adjustable to vary the biasing force determinative of said force level.

* * * * *

UNITED STATES PATENT AND TRADEMARK OFFICE
CERTIFICATE OF CORRECTION

PATENT NO. : 4,270,694

DATED : June 2, 1981

INVENTOR(S) : Berthold A. Knauth

It is certified that error appears in the above-identified patent and that said Letters Patent are hereby corrected as shown below:

Col. 9, Line 12, delete "FIG. 1" and substitute -- FIG. 4 --;
Col. 9, Line 24, delete "60" and substitute -- 68 --;
Col. 13, Line 24, delete "15:" and substitute -- 154 --;
Col. 14, Line 6, delete "approximately" and substitute -- appropriately --;
Col. 15, Line 34, delete "is" 2nd occurrence and substitute -- it --;
Col. 17, Line 66, delete "47" and substitute -- 247 --;
Col. 21, Line 27, delete "15" and substitute -- 315 --;
Col. 22, Line 6, delete "increase" and substitute -- increases --;
Col. 22, Line 7, after "328" insert -- automatically diminishes in response to falling temperature --;
Col. 22, Line 13, delete "332" and substitute -- 322 --;
Col. 23, Line 50, delete "to" (second occurrence) and substitute -- the --;
Col. 26, Line 21, delete "to" and substitute -- of --;
Col. 30, Line 16, delete "operated" and substitute -- operate --;
Col. 30, Line 16, delete "speed,range" and substitute -- speed range --;
Col. 31, Line 13, delete "siad" and substitute -- said --;
Col. 31, Line 30, delete "therby" and substitute -- thereby --;
Col. 32, Line 2, delete "dya-" and substitute -- dy- --;
Col. 32, Line 10, after "flow" insert -- rate --;

Signed and Sealed this

Fourth Day of August 1981

[SEAL]

Attest:

GERALD J. MOSSINGHOFF

Attesting Officer     Commissioner of Patents and Trademarks